(12) United States Patent
Jordil et al.

(10) Patent No.: US 10,115,045 B2
(45) Date of Patent: Oct. 30, 2018

(54) ABSOLUTE SURFACE CODING/ENCODING AN AREA IN ABSOLUTE TERMS

(71) Applicant: HEXAGON TECHNOLOGY CENTER GMBH, Heerbrugg (CH)

(72) Inventors: Pascal Jordil, Exoteaux (CH); Robert Fritsch, Balgach (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 0 days.

(21) Appl. No.: 15/256,355

(22) Filed: Sep. 2, 2016

(65) Prior Publication Data
US 2017/0068879 A1    Mar. 9, 2017

(30) Foreign Application Priority Data
Sep. 3, 2015 (EP) .................................. 15183761

(51) Int. Cl.
  *G06K 19/00* (2006.01)
  *G06K 19/06* (2006.01)
  *G01D 5/249* (2006.01)
  *G01D 5/347* (2006.01)
  (Continued)

(52) U.S. Cl.
CPC ..... *G06K 19/06018* (2013.01); *G01D 5/2497* (2013.01); *G01D 5/34776* (2013.01); *G06K 7/10722* (2013.01); *G06K 7/1408* (2013.01); *G06K 7/1443* (2013.01); *G06K 19/06037* (2013.01)

(58) Field of Classification Search
CPC ......... G06K 19/06018; G06K 7/10722; G06K 7/1443; G06K 19/06037; G01D 5/2497; G01D 5/34776

USPC ......................................... 235/435, 487, 494
See application file for complete search history.

(56) References Cited

U.S. PATENT DOCUMENTS 4,794,251 A    12/1988    Scholian
5,173,693 A    12/1992    Fry
(Continued)

FOREIGN PATENT DOCUMENTS

CH    704 584 A2    9/2012
CN    103917892 A   7/2014
(Continued)

OTHER PUBLICATIONS

European Search Report dated Jul. 20, 2016 as received in Application No. 15183761.4.

*Primary Examiner* — Karl D Frech
(74) *Attorney, Agent, or Firm* — Maschoff Brennan

(57) ABSTRACT

Some embodiments of the invention include an area position code pattern, comprising an arrangement of code marks in a basic grid. At least one portion of said position code pattern is readable by a matrix sensor for determining positions. According to some embodiments of the invention, the position code pattern is embodied with a first absolute code sequence in a stringing-together of the code marks in a first line direction of the basic grid as first line on the area to be encoded and the code marks are encoded with a second absolute code sequence in the line direction along a second line which follows the first line. The first line and the second line form a line pair and the two absolute code sequences are each arranged offset in the first direction in the basic grid in a subsequent line pair.

20 Claims, 8 Drawing Sheets

---

Detecting a portion of the absolute area code with an area sensor and determining the situations of the code marks
74

Determining an alignment of the basic grid of the absolute area code
75

Evaluating the encoding of the code marks and established absolute position information
76

(51) Int. Cl.
  *G06K 7/14* (2006.01)
  *G06K 7/10* (2006.01)

(56) References Cited

U.S. PATENT DOCUMENTS

| | | | |
|---|---|---|---|
| 6,182,901 B1 * | 2/2001 | Hecht | G06K 7/14 235/487 |
| 6,528,783 B1 | 3/2003 | Mortara et al. | |
| 6,548,768 B1 | 4/2003 | Pettersson et al. | |
| 7,199,355 B2 | 4/2007 | Lippuner | |
| 7,543,488 B2 | 6/2009 | Staudenmann et al. | |
| 8,031,334 B2 | 10/2011 | Lippuner et al. | |
| 9,273,946 B2 | 3/2016 | Siercks | |
| 9,529,085 B2 | 12/2016 | Stutz et al. | |
| 2007/0246537 A1 | 10/2007 | Tsai et al. | |

FOREIGN PATENT DOCUMENTS

| | | |
|---|---|---|
| CN | 104279954 A | 1/2015 |
| DE | 699 33 050 T2 | 12/2006 |
| DE | 60 2004 009 429 T2 | 10/2008 |
| EP | 0 368 605 A2 | 5/1990 |
| EP | 0 268 558 A2 | 5/1998 |
| EP | 1 099 936 A1 | 5/2001 |
| EP | 1 473 549 A1 | 11/2004 |
| EP | 1 632 754 A1 | 3/2006 |
| EP | 1 147 376 B1 | 8/2006 |
| EP | 1 750 099 A1 | 2/2007 |
| EP | 1 944 582 A1 | 7/2008 |
| EP | 2 056 233 A2 | 5/2009 |
| EP | 2 133 824 A2 | 12/2009 |
| EP | 2 169 357 A1 | 3/2010 |
| EP | 2498076 A1 | 9/2012 |
| EP | 2 546 613 A2 | 1/2013 |
| WO | 01/26032 A1 | 4/2001 |
| WO | 02/084473 A1 | 10/2002 |
| WO | 2004/094957 A1 | 11/2004 |
| WO | 2004/102123 A1 | 11/2004 |
| WO | 2010/112082 A1 | 10/2010 |

* cited by examiner

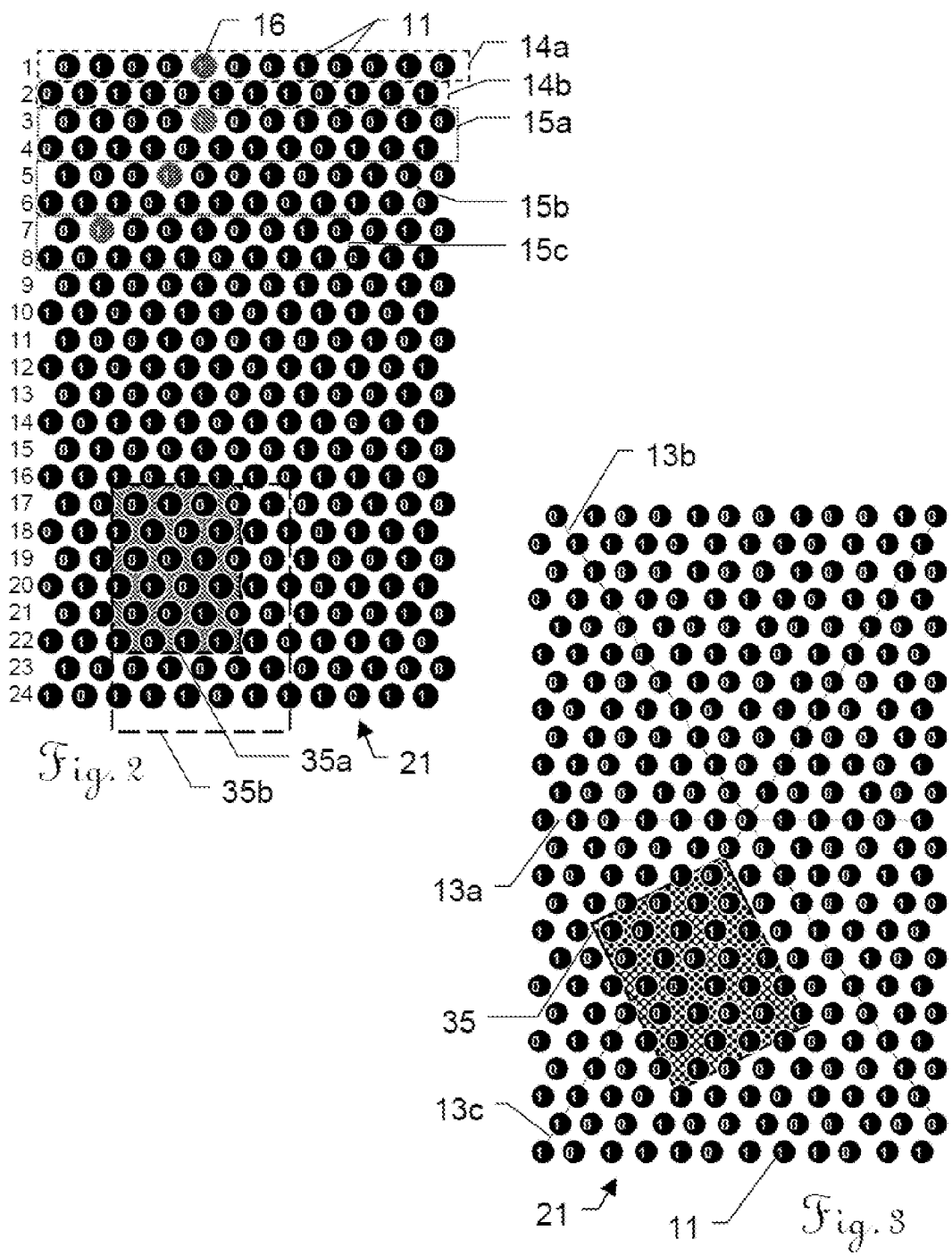

Providing a basic grid for code marks
71

Providing two distinct codeword, distinguishable absolute code sequences
72

Encoding the code marks in accordance with the absolute code sequences
73

Fig. 11

Detecting a portion of the absolute area code with an area sensor and determining the situations of the code marks
74

Determining an alignment of the basic grid of the absolute area code
75

Evaluating the encoding of the code marks and established absolute position information
76

Fig. 12 though present (FFT) is a reference structure which does not contribute to the code value. Moreover, the coding laws of the codes used in the prior art are often complicated, leading to increased decoding outlay or slower evaluation.

ABSOLUTE SURFACE CODING/ENCODING AN AREA IN ABSOLUTE TERMS

FIELD OF THE INVENTION

Some embodiments of the invention may relate to an area position code pattern and an area sensor for determining centroids and, moreover, an absolute measurement system comprising an area position code pattern, as well as an identical method and a computer program product.

BACKGROUND

In many applications, a position needs to be determined in two or more degrees of freedom. By way of example, a plurality of positions and/or situations of one-dimensional movement axes are usually determined in the case of coordinate measuring machines, which movement axes are linked to form coordinate information of a measuring head, by means of which measuring head geometric or other physical properties of the measurement object to be measured are determined. By way of example, another example are processing machines, in which a tool is intended to be measured or positioned in relation to a coordinate table. In addition to the conventional approach of using a Cartesian arrangement of two situation encoders, respectively for an X- and Y-direction, or for polar coordinates, to this end, it is a goal worth pursuing to detect the position using only a single situation encoder for both directions. Here, the area to which the established position and/or situation relates need not necessarily be planar but can also be embodied in a spherical fashion or as any free-form surface. Listed here as an example is a ball joint, movable in three degrees of freedom, in particular an articulation of an articulated arm or the like.

By way of example, for determining positions, EP 1 147 376 exhibits a phase measurement with an analog calculation of the correlation with sin/cos for incremental sensors. EP 1 750 099 complements such a phase measurement with the sin/cos correlation by an additional estimation of the frequency by means of an FFT (Fast Fourier Transform). For the correlation with sine and cosine functions, applied in the process, for detecting periodic patterns, use is generally made of area sensors such as CCD or CMOS sensors. With use of such array or area sensors, e.g. DE 699 33 050 describes a calculation of a correlation with sin/cos for incremental sensors. In EP 1 750 099, an estimation of the frequency with the aid of a Fast Fourier Transform (FFT) is also proposed in addition to the phase measurement. DE 60 2004 009 429 or EP 2 169 357 describe, inter alia, a summing of lines and/or columns of such an optical area sensor during the evaluation thereof.

Here, an incremental position determination, as finds use in the case of e.g. optical computer mice, is too imprecise or too susceptible to errors, particularly in the case of industrial applications. Therefore, an absolute determination of position in relation to an area should be provided, which renders it possible to determine a unique spatial position and, preferably, also a spatial situation of a sensor in relation to a reference surface or to an object to be measured. By way of example, EP 2 546 613 exhibits a nested encoding made of incremental and absolute code, or WO 2010/112082 shows a phase calculation of a Manchester-encoded absolute scale. EP 1 099 936 uses a combination of an absolute and relative 2D encoding. EP 1 473 549 shows an absolute encoding in each cell and EP 2 169 357 shows a nested encoding made of incremental and absolute code with an additional estimate of a twist by means of a 2D FFT.

Other examples of area codes are found, for example, in EP 2 133 824, U.S. Pat. No. 6,548,768, U.S. 2007/0246547 or WO 01/26032, with these not being continuous position codes for a position encoder for the precise determination of position and/or situation, which is applicable for industrial coordinate measuring machines, but area codes for characterizing relatively large regions with an absolute value assigned in each case to the region. By way of example, this is also connected to the fact that, in the documents above, the codes are only scanned, read and evaluated at points, whereas a code for a situation encoder sensor in accordance with the present invention moves continuously over the code area and, in the process, detects the position and/or orientation thereof with a resolution which goes beyond that of pure codeword information. Specifically, in an application according to the invention, it is therefore not only an encoding, but also a precise situation of the read code marks of the absolute encoding relative to the sensor which are evaluated.

Area codes according to the prior art are therefore usually incremental, or these locations do not constitute a continuous position code, but merely encode regions or areas with respectively associated codewords, such as e.g. in the case of code reader pens for paper wares in entertainment articles or the like. In these, the reader pen is always applied at a point and a codeword is established at this respective point. By contrast, embodiments of a present position code are embodied to such a purpose that a reading head is moved, preferably continuously, over the code area and position values are established in the process, said position values being more accurate than the pure, read absolute code values—i.e., in particular, a situation of one or more of the code value-forming code marks in relation to the reading-out sensor is also taken into account in the evaluation.

Moreover, in the prior art, a comparatively large code area portion usually needs to be detected by a correspondingly large sensor area in order to be able to encode a large area absolutely. Often, a considerable part of the code area is also used for a reference structure which does not contribute to the code value. Moreover, the coding laws of the codes used in the prior art are often complicated, leading to increased decoding outlay or slower evaluation.

In the field of the absolute area position encoding described here, a position and/or a twist should be determinable with high accuracy. In a specific embodiment, it is additionally also possible to determine tilts and/or a distance of the sensor from the encoded area, at least with a lower accuracy and/or a smaller measurement region than is the case in the primarily evaluated degrees of freedom of the 2D area code. As a result of this, it is possible, for example, to qualify and/or quantify possible maladjustments or deviations, e.g. as a result of adjustment errors, deformations, temperature expansions, etc., and these can be at least partly compensated mechanically or numerically.

SUMMARY

It is therefore an object of the present invention to provide an absolute encoding for area sensors, with the aid of which absolute positions are determinable in at least two degrees of freedom.

Here, an object of the present invention can be considered that of providing an improved code scale or an improved sensor, a corresponding measurement system and an improved method for determining positions and/or alignments of a sensor in relation to a surface scanned thereby, by means of which the absolute position/situation is determinable in a simple but precise manner, preferably in two, three or more dimensions.

Here, a further, special object is that of also rendering a deviation of a position sensor from its ideal situation in relation to the code pattern determinable, in particular in order to make up to six degrees of freedom detectable.

In particular, it is an object to make a large measurement region detectable in absolute terms with a high position resolution, in particular without needing to detect a comparatively large portion of the code pattern to this extent and/or without requiring a computationally intensive evaluation of the detected code portion which is susceptible to errors.

It is also part of the object to provide a corresponding, associated area sensor chip next to the area code, said area sensor chip being embodied for the advantageous evaluation of the area code. Accordingly, it can also be considered to be an object to provide a system and a method for encoding a position of an area in absolute terms.

The present invention relates to an area position code pattern or a measuring standard with such an area position code pattern. It has an arrangement of code marks in a basic grid.

At least one portion of the area position code pattern is readable by a matrix sensor for determining positions in at least one degree of freedom, preferably for determining positions in at least two degrees of freedom or in more than two degrees of freedom (e.g. 3, 4, 5 or 6 degrees of freedom). Here, the matrix sensor can, in particular, be an optical matrix sensor such as a CCD sensor or CMOS sensor.

According to the invention, a first absolute code sequence in a stringing-together of the code marks in a first line direction of the basic grid is embodied as a first line on the area to be encoded and the code marks are encoded in the line direction with a second absolute code sequence along a second line which follows the first line. In particular, the first absolute code sequence and the second absolute code sequence have distinct codewords from one another. By way of example, the first absolute code sequence and second absolute code sequence are each parts of a single, common maximum sequence, which is divided into the at least two parts with different primary period lengths.

Here, the first line and the second line form a line pair and, in a subsequent line pair, the absolute code sequences in the line pair are arranged offset in relation to the preceding line pair, in each case in the line direction in the basic grid, in particular offset by one period of the basic grid.

Expressed differently, it is possible, in conclusion, to provide a very large area with an absolute, multi-dimensional position code by means of a comparatively small area sensor in the case of the present invention.

In a developed embodiment, it is moreover possible also in this case to very precisely determine a twist of the sensor on the surface. If area dimensions and/or point separations of the code marks are additionally evaluated in the 2D code according to the invention, up to six degrees of freedom are determinable, wherein the three degrees of freedom lying in the code area plane are determinable with a higher accuracy. Here, decoding is comparatively simple, particularly in an embodiment in which a decomposition of a single maximum sequence into two distinct element sequences is applied. Moreover, in terms of the scaling thereof, an area encoding according to the invention is in each case adaptable to the respective application in an ideal manner.

The area position code pattern can be built up by standardized, uniform code marks, preferably by code marks with convex external contours.

In the area position code pattern, the code marks can be detected by means of the area sensor, for example in terms of the position thereof in relation to the area sensor on the basis of the volume centroids thereof and/or in terms of the size thereof on the basis of the volume thereof.

Here, a value encoding of one of the code marks can be embodied in the form of a geometric deviation of the code mark from an intended position in the basic grid. In particular, the basic grid can be orthogonal or hexagonal in this case. The deviation can be kept small in relation to the grid spacing, for example less than $\frac{1}{3}$ or preferably approximately $\frac{1}{10}$ of a period of the basic grid.

Here, the first absolute code sequence and the second absolute code sequence can be embodied in such a way that both have the same code direction in the basic grid; i.e., in particular, they are not orthogonal to one another, i.e. they preferably have at least approximately parallel code directions in the case of plane areas.

The invention also relates to an associated area sensor for determining centroids of code marks, in particular of code marks of an area position code pattern described here. In this case, the area sensor can have such an embodiment that there is a line-by-line readout of the array in the case of an array of sensor elements, in particular with a regular two-dimensional arrangement of the sensor elements. During this readout, for a line of the array, it is possible to carry out an integration of the read values of the sensor elements of this line of the array to form a summed value, from a defined trough threshold being overshot by the read value at a first sensor element to the trough threshold being undershot at a second sensor element of the respective line. Here, the area sensor can e.g. have such an embodiment that it has an analog shift register for the photoinduced electrons collected in the pixels, by means of which the photocharges of a plurality of pixels can be selectively displaced into a common accumulator (e.g. a potential well) and accumulated, i.e. summed, there. This accumulator.

The actuation of the integration or the integral formation in the accumulator can be carried out with (primary) dependence on the threshold comparison, which, as it were, predetermines the integration limits. Likewise, the evaluation and/or the deletion of the integration can primarily be carried out in a manner dependent on the threshold comparison. For these purposes, the area sensor for determining centroids can have an appropriate embodiment in terms of hardware. Moreover, the area sensor for determining centroids according to the invention can be embodied with a circuit for providing the pixel indices of the threshold overshoot and/or threshold undershoot.

Here, a first position index of the first sensor element and a second position index of the second sensor element are each detected along the sensor line. The area sensor provides the summed value and the first position index and the second position index. In particular, the provision in this case can be carried out in digitized form, especially by virtue of the area sensor having an analog-to-digital converter or being connected to the latter.

The area sensor can have an analog accumulator, which is embodied in such a way that, therewith, the integration of the read values of the sensor elements is carried out in analog form. In particular, the area sensor can have such an embodiment that the analog sum from the accumulator established thereby undergoes analog-digital conversion.

The area sensor can also have at least one analog comparator, which is embodied in such a way that, therewith, overshooting and/or undershooting of the defined trough threshold of a read value of the sensor elements is established. In particular, the area sensor can in this case have such an embodiment that the position index of the relevant sensor element read as overshooting and/or undershooting is establishable on the basis of a counter of a clocking of the sensor elements in the relevant line.

The area sensor can also have at least one analog subtraction circuit, which is embodied in such a way that, therewith, the trough threshold is respectively subtracted from the read values of the sensor elements prior to the integration and positive difference values resulting therefrom are integrated. In particular, the area sensor can in this case have such an embodiment that the overshooting and/or undershooting of the defined trough threshold is established on the basis of the sign of the difference values.

Moreover, the area sensor can have a computing unit, which is embodied to establish a centroid position index from the first position index and the second position index and the sum. In particular, this position index can also have a fractional component.

The area sensor can have at least one second integrator circuit, preferably analog integrator circuit, which is embodied in such a way that, therewith, the sums of the individual lines for overlapping position indices are integrable over a plurality of lines.

Consequently, the invention likewise relates to an associated, absolute measurement system comprising an embodiment of an area position code pattern described here and comprising an embodiment of an area sensor described here.

The invention likewise relates to an associated method for encoding absolute positions of surfaces by means of an absolute code pattern. This method comprises:
provision of a preferably regular basic grid for code marks,
provision of two distinct codeword absolute code sequences, in particular from a single, common maximum sequence which is decomposed into two distinct element sequences, and
encoding of the code marks of the basic grid with an offset of the code marks in relation to the basic grid positions thereof in accordance with the code values of the absolute code sequences.

In particular, it is possible here in each case for there to be alternate arrangement of the two absolute code sequences counter to the code sequence direction thereof, as a result of which code line pairs arise in each case (or code line triplets, etc., in the case of more than two different absolute code sequences). For each one of the code line pairs arising in the process, there can then be, respectively in the code sequence direction, a different phase shift of the code sequence positions in the grid. This phase of this shift can, in this case, relate especially to the periodicity of the code sequence and therefore, in particular, make up an integer multiple of the grid positions.

Likewise, the invention relates to an associated method for evaluating an area absolute code pattern described here, comprising
detecting a section of the area absolute code pattern by an area sensor and determining a position of code marks of the area absolute code pattern in the detected section in relation to the area sensor, in particular comprising determining the situations of the centroids of the code marks, wherein, in particular, use can be made of an area sensor for determining centroids, described especially here,
determining an alignment of a basic grid of the area absolute code pattern on the basis of the previously established situations of the code marks,
evaluating an encoding of the code marks along the previously determined alignment,
establishing absolute position information on the basis of the evaluated encoding of the code marks,
locating the established absolute position information on the basis of the situations of those code marks, determined in relation to the area sensor, which underlie the established absolute position information, and
providing the alignment and/or the absolute situation of the area sensor in relation to the area absolute code pattern on the basis of the locating step.

In particular, the evaluation of the encoding can take place in this case in a plurality of lines aligned with the alignment of the basic grid, which lines have at least two distinct codeword absolute code sequences and a phase offset between the lines on the basic grid.

The present invention likewise comprises a computer program product with program code, which is stored on a data medium or provided as an electromagnetic wave (e.g. as radio signal), which is embodied to execute a method as described here on a digital computer. In particular, wherein the program code is embodied for determining the position on the basis of an area position code pattern according to the invention, or wherein the program code is embodied for determining centroids of code marks of the area position code pattern using an area sensor according to the invention. This applies especially if the program code is executed in an absolute measurement system according to the invention.

Likewise, the invention also comprises such a computer program product which is embodied to generate an area absolute code according to the invention, in particular in accordance with the method listed here. The invention also comprises such a computer program product which is embodied for evaluating, according to the invention, position and/or situation information, preferably in two, three or more degrees of freedom, of an area absolute code according to the invention. Moreover, a computer program product which is embodied for actuating and/or evaluating an area sensor according to the invention for determining centroids is part of the invention. This applies, especially, if the aforementioned computer program products are carried out on a digital computing unit of a 2D position code reading unit or on a position determination system connected to the area sensor.

BRIEF DESCRIPTION OF THE DRAWINGS

The method according to the invention and the apparatus according to the invention are explained in more detail in a purely exemplary manner on the basis of specific exemplary embodiments depicted schematically in the drawings, with further advantages of the invention also being discussed. In detail:

FIG. 2 shows an example of a first embodiment of an area position code pattern according to the invention for explaining the design principle according to the invention;

FIG. 3 shows an example of the first embodiment of an area position code pattern according to the invention for explaining evaluation principles and ambiguity resolutions according to the invention;

FIG. 11 shows an exemplary illustration of a simplified flowchart of a course of encoding according to the invention;

FIG. 12 shows an exemplary illustration of a simplified flowchart of a course of a position determination according to the invention;

FIG. 13a shows an exemplary embodiment of the invention in an application on a measurement table or the like;

DETAILED DESCRIPTION

Figure 1A:
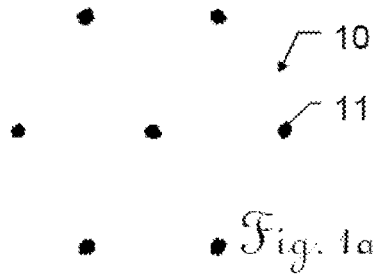
FIG. 1a, FIG. 1b, FIG. 1c, FIG. d.
Figure 1E:
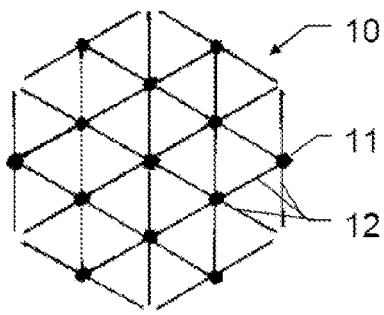
FIG. 1e, FIG. 1f, FIG. 1g show a first exemplary embodiment of a basic grid for an area position code pattern according to the invention, and a possible realization.
Figure 1B:
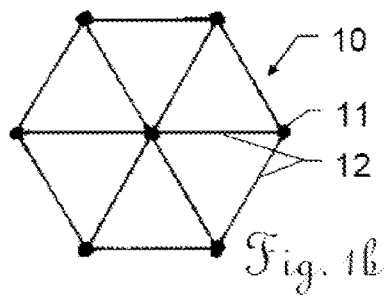
Figure 1C:
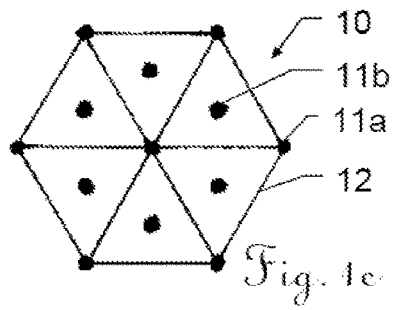
Figure 1F:
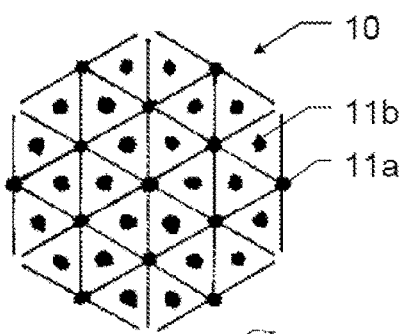

Provided nothing else is explicitly stated, the figures should not be considered to be true to scale in this case. To the extent that this is practical, equivalent or functionally similar features have been provided with the same reference sign throughout and are, where necessary, distinguished by a lowercase letter as an index.

For easier understanding, many of the following explanations are elucidated on the basis of an exemplary embodiment of an area position code according to the invention and an embodiment, connected therewith, of an area sensor for determining centroids according to the invention. However, in other embodiments, the principle according to the invention can e.g. also be implemented in an analogous manner in other variations of the underlying principle according to the invention, for example with other known encodings of the code marks. In particular, the different combinations of the aspects illustrated here in an exemplary manner in one or more of the different embodiments likewise constitute embodiments according to the invention.

The absolute area code according to the invention is a, preferably—but not necessarily—according to a regular,— but at least known—grid of an arrangement of code marks on an area to be encoded. In the 2D encoding described here, distinct codeword sequences are used according to the invention as code sequences, in particular binary sequences which are each repeated periodically. The repetition preferably occurs periodically with the primary period of the sequence. Examples of such distinct codeword sequences with a primary period are e.g. maximum sequences (maximum length sequences, MLS), which can be created and/or evaluated in a known manner according to coding laws of very different degrees. Further examples of such, or similar, distinct codeword sequences are, for example, also described in CH 704584. Optionally, it is also possible to use pseudorandom codes (PRC) or else other codes, e.g. empirically established codes, which are suitable for absolute encoding, i.e., in particular, have said property of the distinct codeword property in respect of a sufficiently long codeword of the binary sequence. As mentioned in e.g. EP 0 268 558, it is possible e.g. also to use a maximum sequence with a common coding law in addition to using two different encodings which, in respect of the considered codeword length, have distinct codewords in relation to one another, which maximum sequence is subdivided into two partial sequences—as a result of which it is e.g. possible to simplify the evaluation.

In accordance with one aspect of the invention, which will be treated again in detail below, it is possible to determine the position of the code marks on the basis of the centroid situations thereof in the case of an area code according to the invention, especially with the aid of volume centroids (since an integration of the intensity values of a planar code mark read by the area sensor constitutes a volume).

Thus, a pattern of code marks is detected here with the aid of an area sensor. Here, the code marks can be detected and evaluated on the basis of very different physical principles, for example optically, for example in the form of markings with different degrees of optical transmission and/or reflection, diffractive properties, spectral properties or the like, capacitively, for example in the form of markings with different electric permeabilities, conductivities and/or distances, areas or the like, magnetically, for example in the form of markings with different susceptibilities, magnetizations, distances, areas or the like.

Here, an area sensor with a matrix of a plurality of sensitive points or areas, so called pixels, is used during the detection. In the further embodiments, discussion is directed e.g. especially to an embodiment of an optical area sensor, but this does not constitute a restriction for the area encoding according to the invention since this is also evaluable by other area sensors (even if this possibly has a higher evaluation outlay and/or is correspondingly slower).

By way of example, the code pattern consists of a plurality of code marks in the form of areas, such as e.g. circular areas or other forms, the centroid positions of which can be e.g. stored in a table. As soon as the respective code mark area is identified, the position of the area can be determined with the aid of this table. For the purposes of identifying the respective code mark area, these are encoded in absolute terms in accordance with an absolute code sequence. For encoding purposes, the area centroids are arranged with a slight offset on a grid or lattice, in particular in such a way that this offset is establishable within the scope of the manufacturing tolerances. In addition to a Cartesian lattice, closest packing—i.e. a hexagonal honeycomb structure in the case of a plane area encoding—especially lends itself as a lattice structure.

Closest packing is more difficult to calculate for encoding on a free-form surface or a spherical surface. A good approximation is obtained with the aid of e.g. regular meshes, which can be calculated with the aid of software tools such as e.g. "DistMesh" by Per-Olof Persson from University of California, Berkeley, or with other software with similar functionalities. Alternatively, in a simple embodiment, use can e.g. also be made of the lattice of the structure of fullerenes—which correspond to the conventional football pattern on a sphere. In order e.g. to refine such a fullerene pattern on a sphere surface, a centroid projected onto the sphere surface can be connected with the respective corners in every 5- and 6-sided shape in a first step. If even more points are required, each centroid of the respective triangles projected onto the sphere surface can be successively connected to the associated corners.

FIG. 1a to FIG. 1g show a refinement of a lattice pattern on the basis of a planar hexagon in an exemplary manner. An analogous procedure can also be applied to a curved free-form surface or spherical surface, as described.

Figure 1D:
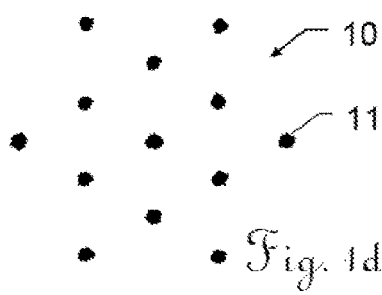
Figure 1G:
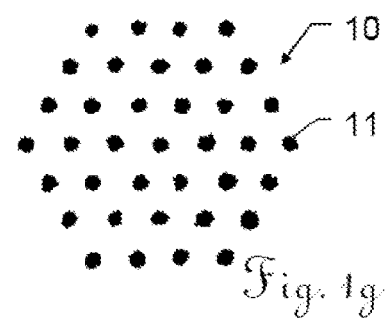

Specifically:
- FIG. 1a shows a base hexagon of the code pattern basic grid 10 of code marks 11 with an additionally introduced code mark point 11 at the center thereof. When determining the center, use can be made of e.g. a centroid, an incenter, a circumcenter, etc.
- In FIG. 1b, the respectively adjacent points 11 are connected in the grid 10 from FIG. 1a such that the shown triangle pattern 12 arises.
- In FIG. 1c, the centers 11b, such as e.g. centroids, incenters, circumcenters, etc., are plotted in these triangles 12 in each case.
- FIG. 1d shows the finer basic grid 10 of code marks 11 from FIG. 1c, which arose, without the bothersome lines 12.
- In FIG. 1e, the respectively adjacent points are once again connected by a line 12.
- As previously, additional code marks 11b are plotted in figure if in each one of the centroids of the triangles respectively arising with the code marks 11a.
- The further refined code pattern 10 of code marks 11, which is shown here without the bothersome lines, is shown in FIG. 1g.
- The process above can be continued as many times as required until a sufficiently fine basic grid 10 of a code pattern is obtained for the corresponding application.

In accordance with the present invention, the basic grid which may have arisen, for example, as explained above—or else in a different manner—is provided with encoding in accordance with the invention and applied to the area to be encoded. Here, according to the invention, a comparatively small sensor suffices in order to determine the absolute position of the sensor in two dimensions on an area, which is relatively large compared to this sensor, encoded with the two-dimensional absolute position code according to the invention and, preferably, also to determine the alignment thereof on the area.

As an example, the following table provides an overview of how strongly the area which is encodable according to the invention increases with the codeword length. In this example, the basic distance between two centroids of the basic grid is assumed to be 250 μm in an exemplary manner. However, arbitrarily larger or smaller basic grid distances can also be applied. Here, these basic grid distances do not primarily have an effect on the obtainable positioning accuracy since the latter is influenced, instead, by the obtainable accuracy of the centroid position determination by the area sensor.

At least three line pairs are always required in the column direction for evaluating the 2D code according to the invention. In practical applications, it is recommended to add at least two additional lines as margin. As a result, the minimum sensor dimensions emerge as $$250\ \mu m \times 5 \times Sqrt(3) = 2.2\ mm,$$

where $\sqrt{3}$ emerges from the vertical distance of the hexagonal basic grid assumed in this example. If twist of the area sensor in relation to the basic grid should also be able to be determined in an advantageous manner, the shorter side of the sensor must therefore be at least 2.2 mm long. In the line direction, the maximum absolute encodable area as a function of the sensor length for the example above can be read from the following table:

| Sensor length | Codeword length | Code length | Absolute encoded width | Absolute encoded height |
|---|---|---|---|---|
| 5 x 250 μm = 1.25 mm | 3 | 3 x 4 = 12 | 12 x 250 μm = 3 mm | 3 mm x √3 = 5.2 mm |
| 6 x 250 μm = 1.50 mm | 4 | 7 x 8 = 56 | 14 mm | 24.25 mm |
| 7 x 250 μm = 1.75 mm | 5 | 15 x 16 = 240 | 60 mm | 103.9 mm |
| 8 x 250 μm = 2.00 mm | 6 | 31 x 32 = 992 | 248 mm | 429.5 mm |
| 9 x 250 μm = 2.25 mm | 7 | 63 x 64 = 4032 | 1 m | 1.7 m |
| 10 x 250 μm = 2.50 mm | 8 | 127 x 128 = 16,256 | 4 m | 7 m |
| 11 x 250 μm = 2.75 mm | 9 | 255 x 256 = 65,280 | 16.3 m | 28.2 m |
| 12 x 250 μm = 3.00 mm | 10 | 511 x 512 = 261,632 | 65.4 m | 113 m |

Consequently, the absolute code according to the invention is easily scalable for the respective application; that is to say, the code size can be selected accordingly depending on the size of the area to be encoded. If need be, it is also possible still to vary the basic grid spacing, which is assumed in an exemplary manner here. In the shown example, it is already possible, for example, to encode an area of 65×113 m in terms of the absolute position and/or alignment by detecting a 3×3 mm section of the absolute code. In a special embodiment, it is possible to realize a determination of six degrees of freedom using the absolute code according to the invention and an appropriate evaluation, of which six degrees of freedom at least three degrees of freedom can be measured with a high accuracy and the remaining three can be detected at least with a comparatively lower resolution and measurement range—which is sufficient in a multiplicity of applications, particularly in view of error recognition.

As an example for encoding according to the invention, a 2D code from the generator polynomial $x^3+x^2+1$ is presented below; however, a multiplicity of different generator polynomials with a higher or lower order, or else different absolute code sequences, can be applied—like those e.g. described in CH 704584, which are incorporated by reference. The maximum sequence associated with the above polynomial from this example is
0100111 . . . ,
and arises from the power sequence of the zeros α, with $\alpha^0 \bmod x^3+x^2+1=1$ $\alpha^1 \bmod x^3+x^2+1=\alpha$ $\alpha^2 \bmod x^3+x^2+1=\alpha^2$ $\alpha^3 \bmod x^3+x^2+1=\alpha^2+1$ $\alpha^4 \bmod x^3+x^2+1=\alpha^2+\alpha+1$ $\alpha^5 \bmod x^3+x^2+1=\alpha+1$ $\alpha^6 \bmod x^3+x^2+1=\alpha^2+\alpha$ $\alpha^7 \bmod x^3+x^2+\alpha=1$ The power sequence shown in the example consequently has seven different elements and the coefficients of α correspond precisely to the aforementioned sequence 0100111 . . . .

As explained in detail in e.g. EP 0 368 605, each maximum sequence can be decomposed into two sequences with half the length (once rounded up and once rounded down). This property can be used in the present invention in order to obtain two distinct codeword sequences, which can easily be distinguished from one another and which, in combination, result in a longer absolute encoding. In one embodiment of the evaluation, it is possible here to advantageously use the fact that both absolute code sequences here are based upon the same generator polynomial.

In the example above, the exemplary absolute code sequence can e.g. be decomposed into the two following sub-sequences:
010 . . . and
0111 . . . .

The sequence 010 . . . in this case contains the code words 1, 2, 4. This is identified by virtue of three bits always being combined. Hence, the binary sequence 01001 . . . becomes 241 . . . in a decimal representation.

The sequence 0111 . . . in this case contains the code words 3, 5, 6, 7. This is likewise identified by virtue of three bits always being combined. Hence, the binary sequence 011101 . . . becomes 3765 . . . in a decimal representation.

Codewords from the respective absolute code sequences can therefore be uniquely assigned to one of the two sub-sequences.

Using such sub-sequences, it is possible to provide an embodiment of a 2D area absolute position encoding according to the invention, like in the example shown in FIG. 2. The numbers in the black circular areas 11 are not present in the actual code and should only clarify which bit value is assigned to the respective code mark 11 during decoding—this would otherwise not be clearly visible with the free eye in this figure. A preferred embodiment of the representation of the code values in accordance with the invention is once again discussed in detail below in particular with reference to FIG. 3.

FIG. 2 shows, in an exemplary manner, an area region which can be encoded in absolute terms at most with the decomposed sequence with a length of seven, which is explained above in an exemplary manner. The binary encoding with "0" and "1" can in this case, for example, be embodied as shown in the figure; however, it is also possible to embody other arrangements according to the principle according to the invention in an analogous manner, in particular by virtue of e.g. selecting the respective start values differently. As already explained above in relation to the absolute code sequences, the codewords for decoding each have a length of three bit in this example. Therefore, for decoding purposes, the area sensor 35a needs to detect at least three code marks in the line direction in this example, and at least six lines orthogonal thereto. However, the sensor 35b is preferably embodied to be larger by a margin in both directions, as shown e.g. in the figure.

In the lines 1, 3, 5, . . . (i.e., for example, in the framed line denoted by 14a), it is possible to find in each case the first one of the sub-sequences explained in the example above, which sub-sequence is arranged four times in succession in the line direction. In the given example, this constitutes the maximum number with which, with the aid of the second sub-sequence, an absolute position encoding in the line direction is possible. In general, the maximum number emerges in such an embodiment as the smallest common multiple of the sequence length.

In the lines 2, 4, 6, . . . (i.e., for example, in the framed line denoted by 14b), it is possible to find the second one of the sub-sequences above, three times in succession in the line in each case. This is likewise the maximum number with which, with the aid of the first subsequence, an absolute position encoding in the line direction is possible. Using such a code pattern, it is possible to decode in absolute terms the position in the horizontal line direction. To this end, a codeword with at least sufficient length for the employed absolute code sequence, i.e. a sufficiently long sequence of code marks, is detected by means of the area sensor and the codes value thereof are determined. For the codeword established thus, it is possible to uniquely determine, firstly, the belonging to one of the sub-sequences and, secondly, the position of the detected codeword within the sub-sequence as well. When determining the position, the position of the detected code marks in relation to the area sensor is also taken into account in terms of the pixel coordinates (or sub-pixel coordinates) thereof. Hence, an absolute position of the area sensor in relation to the code pattern is establishable along the horizontal, i.e. in the line or the code direction.

In the perpendicular, i.e. orthogonal to the lines above, the position is encoded by the respective displacements of the sub-sequences in the line direction, which is also referred to as phase shift in respect of the basic period of the sub-sequence. In the shown example, the phase shift of the first sub-sequence equals zero between line 1 (with numbers 14a+15b) and line 3 (with number 15a), it equals 1 between line 3 (with number 15a) and line 5 (with number 15b), equals 2 between line 5 (with number 15b) and line 7 (with number 15c), and so on. This is made visible in the figure on the basis of one marking 16 of one of the code marks by special hatching—however, an optical difference of one or more code marks is not required for the present invention since the phase shift is clear for the evaluation on the basis of the read codeword.

Thus, in the shown example, the phase increase increases by one with each line pair 15a, 15b, 15c, . . . .

This is advantageous in that the phase difference directly encodes the line pair. These phase differences repeat four times in the perpendicular for the first sub-sequence. For the second sub-sequence, the phase differences 0, 1, 2 and 3 repeat three times in the perpendicular. The position in the perpendicular is decodeable in an absolute manner on the basis of these phase shifts and a uniqueness range in the perpendicular of 3×4=12 line pairs emerges in this example. Here, once again, the position of the detected code marks in relation to the area sensor 35a, 35b in the pixel coordinates thereof is taken into account when determining the position.

In the shown exemplary embodiment in FIG. 3, the code marks 11, which are embodied here in an exemplary manner as full circles, are shifted to the left for a bit value of "zero" by a fraction of the basic period, in particular by less than half, preferably by less than a quarter or even less. Accordingly, the circles 11 for the bit value "1" are displaced to the right in respect of the basic grid. This embodiment easily renders it possible for a twist between the image sensor 35 and the 2D code pattern to be establishable in addition to the position information explained above.

Three lines 13a, 13b, 13c are plotted in the figure. These mark the axes of symmetry of the code pattern in respect of a twist. If these three lines of best fit are calculated on the basis of the centroids of the circular areas 11, the centroids of the circular areas on the horizontal line along a line have the smallest deviation from the line of best fit 13a. The deviation is greater in the case of the oblique lines 13b, 13c as the circular areas 11 in that case do not extend exactly along the line due to the encoding but instead are shifted in relation thereto by an angle.

In order to elucidate the principle according to the invention, the three straight lines 13a, 13b, 13c plotted in the picture above are considered below. In order to keep the example simple, possible positioning and measurement inaccuracies are neglected. Since the image sensor 35 need not record more than four centroids in the line direction to determine the absolute position already described above, the first four centroids are also only considered in the example.

In the example, the point spacing in the undisplaced grid is assumed to have a value of two; the displacement in accordance with the bit values is one tenth. These assumptions have been selected purely in an exemplary manner and are not restrictive as a matter of principle, i.e. they can also be selected differently in other embodiments. All that needs to be observed when selecting the distances and the displacement is a sufficient identifiability and unique distinguishability in the given combination of sensor and code pattern, which can be established mathematically and/or empirically.

If the line 13b from top left to bottom right is considered in a first example, the following centroid positions of the code marks lying on this line emerge in this example:

(−0.1,0)(1.1,−1.732)(2.1,−3.464)(3.1,−5.196).

A regression line can be determined in a manner known per se (e.g. using an algorithm similar to that of the "polyfit" function in the "Matlab" mathematics software) from these centroid positions, in the given example as:

$y=-1.63 \cdot x-0.0708$, with the norm of the residuals, which is likewise establishable thereby, emerging as $\mathrm{norm}r=0.179$.

As a result of the comparatively high norm of the residuals, it is possible to identify that this straight line does not contain any coding.

If the straight line 13a from left to right in the center is considered in a second example, the centroid positions emerge as:

(0.1,0)(2.1,0)(3.9,0)(6.1,0).

Here, the associated regression line emerges as $Y=0$ and the norm of the residuals emerges as $\mathrm{norm}r=0$.

From the low norm of the residuals, it is possible to deduce that this straight line may contain encoding. If further straight lines which are parallel with the potentially encoded line are considered in the same manner, and if these likewise result in small norms, the conclusion above that this direction is an encoded straight line is confirmed since the norms of parallel straight lines would generally deviate from one another in other directions.

If the straight line 13c from bottom left to top right is considered in a third example, the centroid positions emerge as:

(0.1,0)(1.1,1.732)(2.1,3.464)(3.1,5.196).

The regression line here is calculated as:

$y=-1.73 \cdot x-0.173$, and the norm of the residuals is calculated as:

$\mathrm{norm}r=0$.

It could be concluded from the low norm of the residuals that this straight line could contain encoding. However, since all centroids have the same distance from one another, the encoding resulting therefrom would be incorrect (i.e. has a value which does not occur in the absolute sequences) and therefore this cannot be a code direction. Moreover, what emerges if—as already explained in the example further above—adjacent straight lines are considered, these have a norm of residuals which is too large. Consequently, these straight lines are not encoded. When calculating the line of best fit all parallel straight lines are estimated simultaneously in an advantageous embodiment, as a result of which the accuracy of the estimate for the respective straight line can be increased further.

Once the code direction has been found, codewords can be evaluated in the detected sections of the code pattern and absolute position information of the area sensor 35 in relation to the code pattern can be determined therefrom. A highly resolved item of position information, in particular with a high positioning accuracy down to a sub-pixel resolution of the area sensor, i.e. with a fractional component, of the area sensor 35 in relation to the code pattern can be determined from this absolute position of the detected codewords on the basis of the positions of the code marks, which form these codewords, in particular on the basis of the positions of the centroids of the code marks. Moreover, the code direction can also be used for determining the angle alignment of the area sensor 35 in relation to the code pattern. However, in the example shown above, an uncertainty of the twist through 180 degrees can remain when determining the alignment. By way of example, this uncertainty can be resolved by observing a third code line. If the area sensor 35 is not twisted by 180°, the phase shift between lines 2 and 3 is higher by one than between lines 1 and 2; in the case of a 180° twist, this would accordingly be the other way around.

The following example once again clarifies the relationships above. Once again, the centroid positions of the circular areas 11 from FIG. 3 are considered.

If the origin of the coordinate system is selected to be at the point of intersection of the three straight lines 13a, 13b, 13c, and if the distance of adjacent grid points in a line is selected to be 1 in an exemplary manner, grid points for the lines 1, 3, 5, . . . , are obtained at the positions $$(k_x-11/2,(11/2-k_y)\sqrt{3})\ k_x=0,1,\ldots,11;$$
$$k_y=0,1,\ldots,11,$$

and grid points for the lines 2, 4, 6, . . . , are obtained at the positions $$(m_x-6,(5-m_y)\sqrt{3})\ m_x=0,1,\ldots,11;\ m_y=0,1,\ldots,11.$$

Depending on whether the associated circular area 11 of the code mark is encoded with bit "0" or bit "1", these positions are displaced by one delta to the left or right in the line. Consequently, the centroid positions lie at the following positions:

$$(k_x-11/2+\Delta f_1(k_x,k_y),(11/2-k_y)\sqrt{3})\ k_x=0,1,\ldots,11;$$
$$k_y=0,1,\ldots,11$$

$$(m_x-11/2+\Delta f_2(m_x,m_y),(5-m_y)\sqrt{3})\ m_x=0,1,\ldots,11;$$
$$m_y=0,1,\ldots,11$$

Here, $\Delta$ contains the displacement length of the bit encoding and $f_1(k_x, k_y)$ and $f_2(m_x,m_y)$ contain the respective encoding sequences. In these encoding sequences, a bit value "0" is mapped to a value of $-1$ and a bit value of "1" is mapped to a value of $+1$. Expressed formally, this results in:

$$f_1(k_x, k_y) = f_{1,0}\left(\frac{k_x^2 - k_x}{2} + k_y\right) \text{ where}$$

$$f_{1,0}(x) = \begin{cases} -1 & x\bmod 3 = 0 \\ 1 & x\bmod 3 = 1 \\ -1 & x\bmod 3 = 2 \end{cases} \text{ and}$$

$$f_2(m_x, m_y) = f_{2,0}\left(\frac{m_x^2 - m_x}{2} + m_y\right) \text{ where}$$

$$f_{2,0}(x) = \begin{cases} -1 & x\bmod 4 = 0 \\ 1 & x\bmod 4 = 1 \\ -1 & x\bmod 4 = 2 \\ 1 & x\bmod 4 = 3 \end{cases}.$$

The example above shows an absolute encoding according to the invention in an exemplary manner on a substantially plane surface as a code carrier, such as e.g. a measurement table, on which measuring devices or tools can detect the position and orientation thereof in respect of the measurement table. The surface of a cylinder can likewise be provided with an absolute code as described above, in which the plane surface is bent to be a cylinder. According to this, it is e.g. also possible according to the invention to determine a position and/or alignment of a shaft, roller or the like in two or more degrees of freedom.

However, if a torus, a sphere or else a freeform surface is provided with two-dimensional encoding according to the invention, this cannot be based on a uniform grid in many cases. In addition to the aforementioned, special patterns for basic grids, it is possible, in a special embodiment, for the grid points instead to have a pseudo-random distribution in a known manner. Advantageously, the distribution of the grid points in this case has an autocorrelation side lobe which is as small as possible. By way of example, the aforementioned software "DistMesh" can be used to develop a suitable pseudo-random encoding pattern, wherein the number of points can be slightly altered in the case of a poor autocorrelation property in order thereby to obtain better autocorrelation properties in several iteration steps. Particularly in the case of such a special embodiment with a pseudo-random basic pattern, it is possible, for example, to carry out decoding with the aid of a histogram treatment of all measured centroids with all centroids stored in a table. Here, a maximum of this histogram arises in the case of correct decoding. For the histogram, it is possible e.g. to subtract all stored centroid positions from all measured centroid positions and the histogram can be formed therefrom.

Within the meaning of the above described 2D area position code evaluation, it is the goal in accordance with one sub-aspect of the present invention to provide a matrix or area sensor 35 for calculating volume centroids, with the aid of which sensor it is possible to determine positions. Here, firstly, it is possible to use a conventional semiconductor image sensor, such as a standard CCD or CMOS chip, in which each line is read pixel-by-pixel, each obtained pixel value is digitized and the digitized values are subsequently processed numerically in order to determine the centroid situations of the code marks, for example by means of an image processing algorithm.

In accordance with a special aspect of the present invention, it is secondly possible, in order to enable fast measurement times, for the respective centroid of the code marks 11 to be calculated at least in part directly in hardware for an evaluation of an area position code according to the invention; in particular, it is possible here for time-critical partial calculations of the centroid evaluation to be carried out not only on the basis of digitized, numerical values for each pixel but also for electrically analog pixel values. Here, it is possible, e.g. in the case of the integration in particular, for the pixel values to be added in analog fashion and only the arising sums to be converted with the aid of an analog-to-digital converter. In particular, it is also possible here to use a comparatively slow and correspondingly more cost-effective analog-to-digital converter since, for example, there is no need for a quick digitization of each individual pixel; instead, it is only the integrated sum value of a plurality of pixels that needs to be digitized in each case—and this digitization can moreover be carried out until an analog sum of the next code mark is formed, the latter generally consisting of a plurality of individual pixel values and moreover being separated by a distance of several pixels with pixel values below the trough threshold. Slower signal processing can also be carried out with a lower spectral bandwidth, as a result of which it is possible to filter out more noise and improve the SNR. It is also possible to establish by means of a digital counter or an analog comparator the indices at which the pixel values undershoot or overshoot a (trough) threshold.

In light of the approaches above, it is possible e.g. to keep the area requirements for the circuit on the electronics chip of the sensor small; a lower power consumption can be obtained. However, in particular, it is also possible to obtain a higher readout rate than is possible, for example, when using a conventional CCD chip with pixel-by-pixel digitized read out.

Figure 4A:
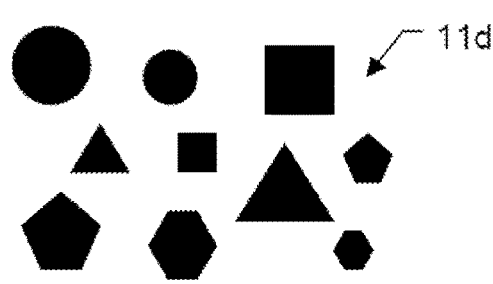
FIG. 4a shows an example of an embodiment of a configuration of code marks which are advantageously designed according to the invention.
Figure 4B:
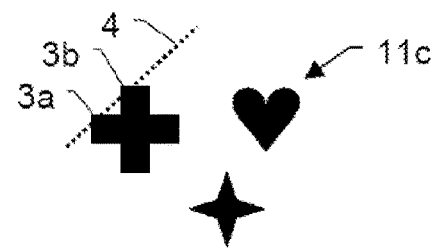
FIG. 4b shows an example of an embodiment of a configuration of code marks which are less advantageously designed according to the invention.

FIG. 4a shows some generic examples of possible pattern elements 11d which particularly in conjunction with an area sensor 35 according to the invention—are advantageously suitable for determining a volume centroid according to the invention. FIG. 4b shows some generic examples of less suitable pattern elements 11c, in which additional measures need to be adopted in order to ensure reliable identification of the belonging-together of the individual pattern elements 11c in each case.

Patterns are unsuitable precisely when there is at least one straight line 4 which intersects the figure of the pattern element 11c more than once. This is because cases may occur in such patterns in which two separated portions 3a and 3b of the same pattern element 11c come to rest on the readout line 4 (e.g. a line of the area sensor 35), which should be combined for the same centroid of the same pattern element 11c by calculation—but which are not directly identifiably connected to one another. This case is not envisaged in the simplest example of the calculation method explained here in accordance with this special aspect of the invention. However, such cases can likewise be covered with the aid of a complicated algorithm within the meaning of the invention described here. Within the meaning of calculating and signal processing which is as simple as possible, a selection of code marks 11d with convex external contours, as are depicted in FIG. 4a, constitute a more advantageous embodiment than the concave code mark examples 11c from FIG. 4b. If concave pattern properties are established in the evaluation by the area sensor 35 or a superordinate logic unit despite the use of convex pattern elements 11d, this can be e.g. a sign for contamination or any other error and, for example, the associated centroid can be discarded or weighted less strongly during the evaluation—in particular if a corresponding margin of additional code marks 11 was detected by the area sensor 35.

In a first embodiment of a centroid determination there can be a readout of the area sensor 35 in a plurality of directions. Here, the volume centroid can be calculated as follows:

$$x_s = \frac{1}{V}\int_K x\partial V =$$

$$\frac{1}{V}\int_{x_a}^{x_b}\int_{y_a(x)}^{y_b(x)}\int_{z_a(x,y)}^{z_b(x,y)} x\partial z\partial y\partial x = \frac{1}{V}\int_{x_a}^{x_b} x \int_{y_a(x)}^{y_b(x)} z(x,y)\partial y\partial x = \frac{1}{V}\int_{x_a}^{x_b} xA_y(x)\partial x$$

$$y_s = \frac{1}{V}\int_K y\partial V = \frac{1}{V}\int_{y_a}^{y_b}\int_{x_a(y)}^{x_b(y)}\int_{z_a(x,y)}^{z_b(x,y)} y\partial z\partial x\partial y =$$

$$\frac{1}{V}\int_{y_a}^{y_b} y \int_{x_a(y)}^{x_b(y)} z(x,y)\partial y\partial x = \frac{1}{V}\int_{y_a}^{y_b} yA_x(y)\partial y$$

$$V = \int_K \partial V = \int_{x_a}^{x_b} A_y(x)\partial x = \int_{y_a}^{y_b} A_x(y)\partial y$$

Here, x and y are the respective readout coordinate directions, z(x,y) is the pixel value, and $x_a$, $x_b$ and $y_a$, $y_b$ are the limits of integration, as the read coordinates of beginning (a) and end (b) of the code mark 11 to be determined. "K" is the body, advantageously separated by a trough threshold plane in the form of a threshold from possible noise, with volume "V", the centroid "$x_s$, $y_s$" of which is calculated.

Here, the formulae above show that, in this embodiment, the components of the volume centroid "$x_s$, $y_s$" are calculated with the aid of the area centroids of the accumulated areas "$A_y(x), A_x(y)$".

Figure 5A:
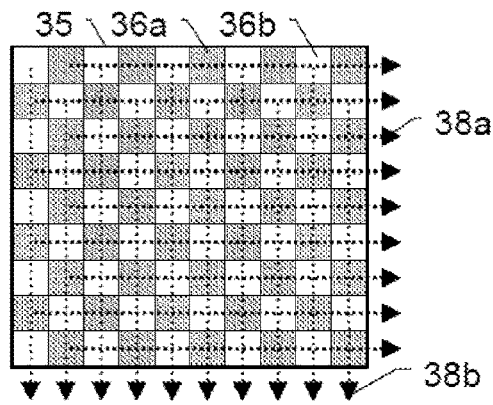
FIG. 5a shows an example of a first embodiment of a pixel arrangement in the case of area sensors.
Figure 5B:
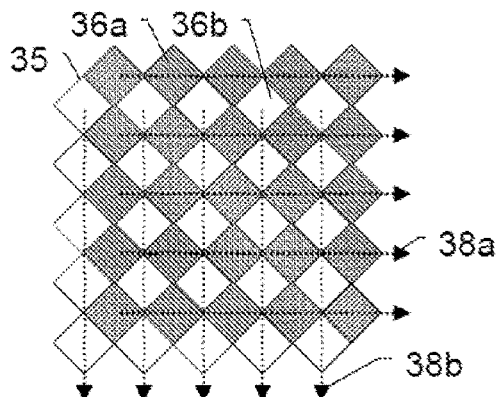
FIG. 5b shows an example of a second embodiment of a pixel arrangement in the case of area sensors.

FIG. 5a and FIG. 5b show examples of embodiments of pixel arrangements in the case of area sensors 35, which can be used in an implementation of the equations above. The shown area sensors 35 of this embodiment are read in two, at least approximately orthogonal directions x (38a) and y (38b). In the two figures, the pixels each have a different embodiment in terms of form and/or arrangement, wherein other embodiments are also usable in addition to the two shown in an exemplary manner. Instead of the shown, approximately rectangular optical active surface sensor structure, it would also possible, for example, to select a different structure, in particular an e.g. circular or hexagonal structure. The arrows at 38a and 38b specify the clocking direction of the respective similarly hatched pixels 36a or 36b.

Figure 5C:
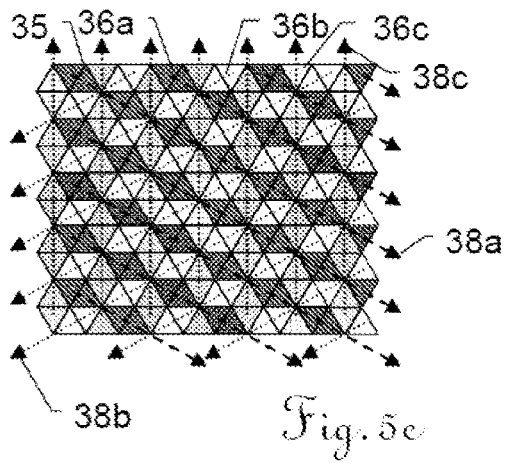
FIG. 5c shows an example of a third embodiment of a pixel arrangement in the case of area sensors.
Figure 5D:
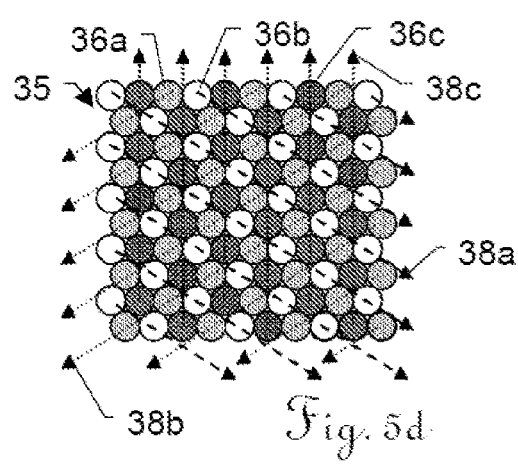
FIG. 5d shows an example of a fourth embodiment of a pixel arrangement in the case of area sensors.

FIG. 5c and FIG. 5d show further examples of alternative embodiments, in which the sensor pixel arrangement 36a, 36b, 36c is read in more than two directions 38a, 38b, 38c, in particular wherein an additional redundancy can be obtained therewith, for example for an error detection, error avoidance or accuracy increase by means of interpolation or a least-square fit.

According to the invention, it is also possible, in addition to the special embodiments of the detecting pixel configuration of the area sensor shown in FIG. 5a, FIG. 5b, FIG. 5c or FIG. 5d, to use conventional embodiments, such as e.g. the full frame, interline transfer, frame transfer or frame interline transfer principles known from CCD or CMOS image sensor technology.

At the end of the arrows 38a, 38b, 38c there is a circuit which compares the respective pixel value to a trough threshold, or which subtracts this trough threshold. Here, the pixel values above the trough threshold are accumulated for as long as the pixel value lies above the trough threshold. Using this trough threshold, a body for the determination of centroids is separated from the measured pixel image toward the bottom, in particular from fundamental noise, stray light or other interference. The pixel at which overshoot or undershoot of the trough threshold occurs therefore constitutes the edge of a detected code mark area. If a pixel value overshoots the threshold, the accumulation of the subsequent pixel values is started; if one of the subsequent pixel values undershoots the threshold, the accumulated sum, together with at least one pixel index of the overshoot/undershoot is provided to a further combination-by-calculation unit. These pixel indices can in each case be the index, i.e. the sensor position coordinate, of the first pixel of the accumulated area, the index of the last pixel of the accumulated area and/or the index of the pixel after the last index of the accumulated area.

Here, integration and/or index determination can be carried out digitally in one embodiment, i.e. after an analog-to-digital conversion of the individual pixel values. However, in an advantageous embodiment, the integration and/or the trough threshold comparison (or trough threshold subtraction) is carried out in an analog manner, i.e., for example, directly with the photogenerated charges from the light-sensitive pixels. By way of example, the charges are compared with the trough threshold by means of a comparator and/or the trough threshold is subtracted by means of a subtraction circuit (and the result thereof after is, when necessary, accordingly compared to zero) and all subsequent values above the trough threshold are integrated in an accumulator. The indices of the associated pixels, i.e., for example, the readout clock cycles at which the undershoot and overshoot of the trough threshold (i.e., for example, the switchover of the comparator) occurs are stored and provided, just like the integrated value of the accumulator which, in the process, is preferably subject to analog-to-digital conversion. Instead of z(x,y), it is alternatively also possible to accumulate z(x,y)+$z_a$(x,y) (where $z_a$(x,y) is the trough threshold), but this leads to larger values and accordingly requires a larger integrator memory and/or a higher analog-to-digital conversion resolution.

Since the time-intensive analog-to-digital conversion need not be carried out for each pixel, but only for each code mark, in the analog-integrated embodiment, it is therefore possible to have a quicker clock and read out than in the case of a conversion of each individual pixel. Including the assumption that a sufficiently large distance must be present between two code marks, and hence, in general, a minimum time duration must pass after the trough threshold is undershot before said trough threshold is overshot for the next time, some of the minimum time duration or the entire minimum time duration can be used for the analog-to-digital conversion—expressed differently, the clocking of the gaps (lying in particular below the threshold) between two code marks can be carried out at the same time as the analog-to-digital conversion in this case.

In this case, the above-described readouts of the area sensor can be carried out separately for each one of the shown arrows 38a, 38b, 38c in one direction, i.e. parallel in time, or successively in time for some or all of the arrows 38a, 38b, 38c.

Figure 6:
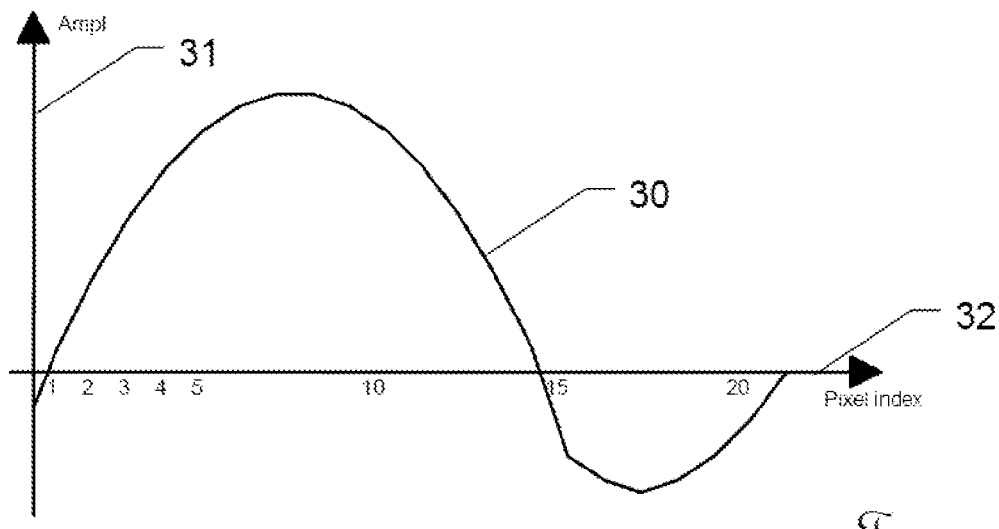
FIG. 6 shows an example of a section of a typical signal when detecting a code mark.

FIG. 6 shows an example of a section of a typical signal which is obtained in the case of clocking of a line (or column) of an area sensor when a code mark of an area position code according to the invention is detected. The abscissa 32 in each case shows the index of the clocked pixel, the determinant 31 shows the respective pixel value which, in the case of photosensors is e.g. proportional to the number of captured photons. In the figure, the pixel values have been connected in accordance with their amplitude to form a continuous curve 30—however, strictly speaking, this is a discrete amplitude value 31 for each pixel index 32 in each case, which comes from the pixel at the position coordinate of the area sensor corresponding to the index.

Thus, in the figure, the abscissa 32 represents the trough threshold; that is to say, this is the pixel amplitude 31 with a trough threshold, which is generally greater than zero, subtracted therefrom, wherein, however, said trough threshold could also be zero in a special variant.

It is possible to identify that the pixels numbered 1 to 14 lie above the trough threshold. These pixel values are combined by calculation or accumulated, preferably in an analog manner as described above, to form an area A between the curve 30 and the axis 32 as the sum of the corresponding pixel values with $$A = \sum_{i=1}^{14} z_i.$$

Then, the value A is subject to analog-to-digital conversion and fed together with the indices "1" of the threshold overshoot and "15" of the threshold undershoot to a computing unit. This computing unit links all areas which belong together which—particularly in the case of convex code mark areas—can be carried out with comparatively little computational outlay on the basis of the indices. By way of example, a basic rule which can be assumed here is the following: if indices of adjacent lines/columns overlap, the associated areas belong to the same volume.

The centroid is subsequently calculated from the volume determinable therewith in accordance with the formulae shown further above. The computing unit for the digital calculation of the centroid of the respective coordinate can be embodied in software or, preferably, in hardware (e.g. as CPLD, FPGA, ASIC, etc.), for example using two accumulators and a division. Hence, the centroids of the code marks in two or three coordinates, which are usable for evaluating a position code according to the invention, are obtained.

In the embodiments with an area sensor readout in three coordinates, one of the coordinates is redundant since the volume calculated at the respective coordinate should be the same everywhere. If it is not the same, the associated centroid can be discarded or it is possible to carry out an interpolation, a voting method, etc.

A disadvantage of area sensors in accordance with the embodiment above from FIGS. 5a, 5b, 5c, 5d is that—in addition to the unconventional specific readout structure—one of the pixels respectively contributes either to determine the centroid coordinate in the X-direction or in the Y-direction, but it does not contribute in the respective other direction in the case of these area sensors which read in a plurality of directions. Hence, it is only a fraction of the physical pixel resolution of the area sensor—present in the form of photoactive elements—that is used in each one of the respective directions for determining the centroid. In the embodiment described below, this should be avoided; that is to say, each one of the pixels should, in particular, contribute information for both centroid coordinate directions.

Figure 7A:
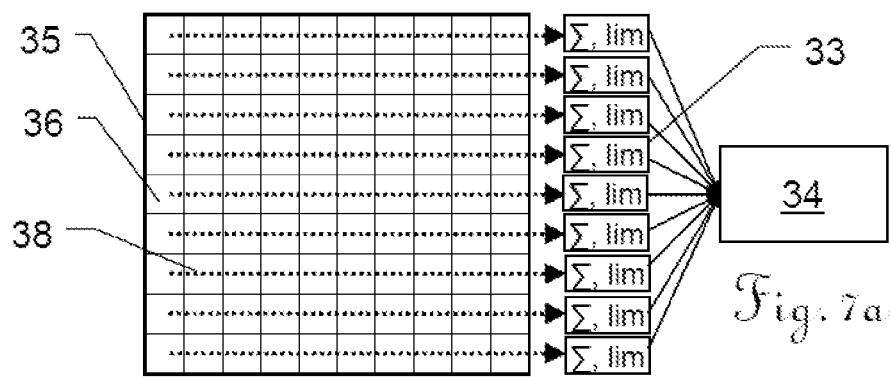
FIG. 7a shows an example of an embodiment of an evaluation according to the invention of an area code according to the invention with determining centroids in a separate line-by-line read out, with an example of a fifth embodiment of a pixel arrangement in the case of area sensors.

FIG. 7a shows an example of an area sensor 35 which can only be read line-by-line and which can be used in accordance with this embodiment of this aspect of the invention. Here, the lines 36 can be read in parallel with one another, i.e. all or some of the sensor lines 36 can be clocked simultaneously. The area sensor 35 preferably has a connection to an at least partly analog signal processing unit 33 for determining centroids, especially with e.g. an analog integration, analog threshold establishment and/or an analog trough threshold subtraction. The results from the signal processing unit 33 are then—preferably in a digitized form—processed further by a computing unit 34, by means of which the situations of the centroids of detected code marks are established in two-dimensional pixel coordinates of the area sensor, preferably with a fractional portion of the pixel coordinates. Preferably, an alignment of the line axes of the area sensor in relation to the line axes of the area position code according to the invention is also determined here as an additional degree of freedom.

Figure 7B:
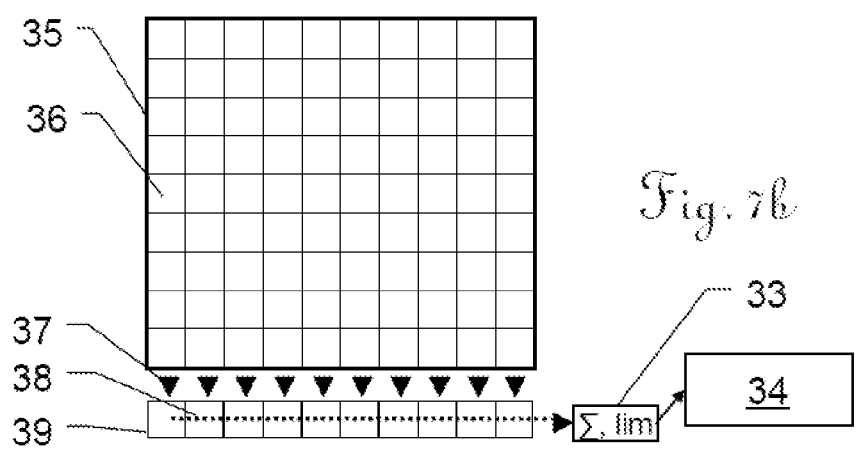
FIG. 7b shows an example of an embodiment of an evaluation according to the invention of an area code according to the invention with determining centroids in an area read out, with an example of a sixth embodiment of a pixel arrangement in the case of area sensors.

FIG. 7b shows a further example of an area sensor which can be read line-by-line and which can be used in accordance with this embodiment of the aspect of the code marks situation determination of the invention. In this area sensor, the line-by-line clocking of the detected pixel values of the sensor area 35 in the direction 38 is carried out by means of the readout line 39. By way of example, it is possible to use a CCD chip on the basis of a full frame, frame transfer, interline transfer or frame interline transfer principle. Preferably, the area sensor 35, like in FIG. 7a, has an at least partly analog signal processing unit 33 for determining centroids or it is connected to one of these, especially with e.g. an analog integration, analog threshold establishment and/or an analog trough threshold subtraction. The results of the signal processing unit 33 are then—preferably in a digitized form—processed further by a computing unit 34 by means of which the situations of the centroids of detected code marks are established in two-dimensional pixel coordinates of the area sensor. Alternatively, or additionally, an alignment of the line axes of the area sensor in relation to a line axes direction of the area position code according to the invention can also be established in the process.

In contrast to the embodiment of the area code evaluation described above, the readout is only still carried out in one direction—toward the right in the shown example—in a non-restrictive manner in the embodiment explained in detail below, enabling an application of an area sensor which can only be read out line-by-line.

In order nevertheless to obtain the centroid coordinates in two dimensions, the value "$A_x(y)$" is determined in addition to the body surfaces A, formally expressed as $$\tilde{A}_x(\tilde{x}, y) = \int_{x_a(y)}^{\tilde{x}} z(x, y)\partial x \text{ and}$$

$$A_x(y) = \tilde{A}_x(x_b(y), y).$$

From this, it is consequently possible to determine the body moments $$M_x(y) = \int_{x_a(y)}^{\tilde{x}_b(y)} \tilde{A}_x(\tilde{x}, y)\partial \tilde{x}.$$

In the determination above, two variants in particular can be advantageous, namely:

$$\tilde{x}_b(y)=x_b(y) \text{ or alternatively } \tilde{x}_b(y)=x_b(y)-1$$

In a digital or numerical embodiment, there can be digital determination of the data above, for which each pixel value $z(x,y)$ needs to be independently converted from analog to digital. In a preferred embodiment, at least one of the integral formations can in turn be carried out using analog signals, for example by virtue of the charges of the pixels to be integrated being integrated in a common accumulator and/or the limits of integration being established by means of an analog comparator. Only the resultant integral values "$A_x(y)$" and/or "$M_x(y)$" are then fed to an analog-to-digital conversion and provided for further calculation. From this information, the sought-after volume centroids are then numerically determined according to the equations $$x_s = \frac{1}{V} \int_{y_a}^{y_b} (\tilde{x}_b(y) + 1) \cdot A_x(y) - M_x(y)\delta y \text{ and}$$

$$y_s = \frac{1}{V} \int_{y_a}^{y_b} y A_x(y)\partial y,$$

and also the volume $$V = \int_{y_a}^{y_b} A_x(y)\partial y,$$

preferably in digital form. Here, the volume centroids $x_s$ and $y_s$ specify the situations of a detected code mark in relation to the sensor and the volume V additionally provides information about the size or area or sensor contrast value of this code mark.

Alternatively, e.g. a readout in the column direction or in any other direction can also take place in the same way, and the centroid coordinates, and also the volume, can be determined with corresponding equations above.

If the pixels in the adjacent lines of the area sensor are arranged with an offset (for example, in the case of a hexagonal pixel structure or the like), such an offset can be taken into account, for example by virtue of said offset being added in the calculation from "$x_s$" to "$\tilde{x}_b$".

The following table represents an example of an area sensor. The lines and columns are each denoted by the index of the pixel coordinates thereof. The numerical values in the tables at the respective pixel indices x and y correspond to the respective pixel values $z(x,y)$, i.e. the information about the code mark detected by the sensor. Here, a "–" represents a value below the trough threshold; thus, in particular, the shown values can be considered to be pixel amplitude values minus the trough threshold.

Compared to the embodiment shown in this simple example for illustrating the principle according to the invention, the area sensor can have a much larger number of pixels and also higher position resolution in practical realizations. Here, the area sensor usually also detects a plurality of code marks simultaneously, whereas only a portion of the area sensor which detects a single code mark is shown here. Here, individual code marks e.g. can easily be kept apart on the basis of the belonging-together of the indices at which the threshold is overshot or undershot.

| x/y | 0 | 1 | 2 | 3 | 4 | 5 |
|-----|---|---|---|---|---|---|
| 0   | — | — | — | — | — | — |
| 1   | — | — | 1 | 2 | — | — |
| 2   | — | 3 | 4 | 5 | 6 | — |
| 3   | — | 7 | 8 | 9 | 1 | — |
| 4   | — | — | 2 | 3 | — | — |
| 5   | — | — | — | — | — | — |

The position code sensor according to the invention should be used to determine a situation of the centroid of the code mark detected by the area sensor in terms of pixel coordinates of the area sensor. Advantageously, the volume is also provided together with the centroid coordinates as an indicator for the size of the detected code mark.

The centroid situation of the body shown in this example is determined using the preferably at least partly analog establishment, explained above, in accordance with the formalism shown above as:

$x_s$=2.4510 and $y_s$=2.6275.

An example of calculations and values in respect of the example above is shown in the following table for clarifying the process according to the invention of determining the centroid, wherein the integrals are accordingly replaced by sums. Here—as described—, $A_x(y)$ is preferably determined by means of an analog summation of the pixel values and only the summed value is digitized. The index $x_b(y)$, at which the trough threshold is overshot, can e.g. be performed with a detection of a counter of the clocking at the time at which an analog comparator detects a pixel value which overshoots the trough threshold. The moment $M_x(y)$ can likewise be embodied with an analog integration, for example by way of an operation amplifier circuit or else by way of a different analog circuit which implements a corresponding summation to form this moment. Alternatively, this second integration can also be realized at least in part in digital form if need be.

Here, an analog implementation is particularly advantageous if this can be carried out more quickly in time than an analog-to-digital conversion of each individual pixel with subsequent digital processing.

| Index y | $A_x(y)$ | $\tilde{x}_b(y) + 1$ | $M_x(y)$ |
|---|---|---|---|
| 1 | 1 + 2 = 3 | 4 | 1 + (1 + 2) = 4 |
| 2 | 3 + 4 + 5 + 6 = 18 | 5 | 3 + (3 + 4) + (3 + 4 + 5) + (3 + 4 + 5 + 6) = 40 |
| 3 | 7 + 8 + 9 + 1 = 25 | 5 | 7 + (7 + 8) + (7 + 8 + 9) + (7 + 8 + 9 + 1) = 71 |
| 4 | 2 + 3 = 5 | 4 | 2 + (2 + 3) = 7 |

The information from the table above, which is established and provided, preferably digitally, by an area sensor according to the invention for determining centroids, in particular in a substantially analog manner and in a correspondingly short period of time, is then fed to a computing unit.

From this, this computing unit can determine the volume $$V = 3 + 18 + 25 + 5 = 51,$$

in particular by easy to implement, successive additions.

Optionally, this volume can also be integrated in an analog manner but this, at best, no longer constitutes a substantial advantage due to the analog-to-digital resolution required in the subsequent analog-to-digital conversion—which must be correspondingly higher than that of the individual summands $A_x(y)$.

Consequently, the centroid coordinates $$y_s = \frac{1 \cdot 3 + 2 \cdot 18 + 3 \cdot 25 + 4 \cdot 5}{51} =$$
$$\frac{134}{51} = 2.6275 = 4 - \frac{3 + (3 + 18) + (3 + 18 + 25)}{51}$$

and $$x_s = \frac{(4 \cdot 3 - 4) + (5 \cdot 18 - 40) + (5 \cdot 25 - 71) + (4 \cdot 5 - 7)}{51} = \frac{125}{51} = 2.4510$$

can be determined by the computing unit. According to the invention, the above-described second variant of calculating the body moments could also be used alternatively in an analog manner hereby; this leads to the same final results of $y_s$ and $x_s$.

An exception to the above-described advantage of forming an analog integral can, for example, constitute a special embodiment of the present invention, in which the analog-to-digital conversion of the pixel values is carried out in a purely binary manner, i.e. using a 1-bit analog-to-digital converter or a comparator. Here, for example, all pixel values which are not represented by "–" in the pixel value table above are evaluated as one and summed; that is to say, e.g., the output of an analog comparator for the trough threshold overshoot is summed with each pixel clock (that is to say a counter is increased) until the first pixel value lies under the trough threshold again. Although this restricts the resolution capability of the determination of the centroid coordinates, this completely dispenses with the analog integration, or reduces it to a digital counter, which likewise enables quick processing. This variant may be advantageous, particularly in the case of a high lateral position resolution of the area sensor when compared with the code marks, i.e. in the case of many pixels.

The readout in only one direction also is advantageous in that precisely the same pixel information is used for both coordinate directions. Therefore, there is no need to undertake a correction for a pixel offset. Moreover, the area sensor structure has a simpler design. The two-fold integration, which is found in this embodiment between clocking of the line and the analog-to-digital converter, can be embodied as an analog two-fold integration circuit, for example with an operation amplifier circuit.

A further advantage of this embodiment is that interference influences, which have the same effect on the analog calculation of "$A_x(y)$" and "$M_x(y)$", largely cancel in a realization according to the invention. Taking this aspect into account, the design and the configuration of the analog circuit is correspondingly simpler.

The concept according to the invention of an area sensor can be implemented with a plurality of chips, in particular with one area sensor and a separate and/or common evaluation chip for the analog and/or digital evaluation. Alternatively, the area sensor and the analog integration according to the invention—and, if need be, the analog-to-digital conversion as well—can also be housed in the same chip. Optionally, a microcontroller/DSP or an FPGA core can additionally also be integrated onto the chip. Here, hardware accelerators in particular, e.g. for parts of the digital centroid calculation, regression calculations, histograms, etc., can be implemented in order to unburden the microcontroller/DSP.

Particularly in the case of an embodiment according to the invention with an analog integration during the centroid determination, measurement rates, and the provision rates thereof, of the order of e.g. up to 100 kHz or even significantly higher can be obtained using current technology with justifiable power consumption when establishing the centroids detected by the area sensor.

In another application than with the above-described position code in accordance with the present invention, the area sensor for determining centroids described here could, if need be, also be considered an independent invention.

Expressed differently, this is an area sensor embodied specifically for determining centroid coordinates of at least one code mark of a position code, in particular an optical area sensor, for example using CCD or CMOS technology, for determining centroids of optical code elements, comprising an array of sensor elements, in particular in a regular, two-dimensional arrangement of the sensor elements, which is embodied, in each case for a line of the array in the case of a defined threshold of the read value of a first sensor element being overshot, to carry out an integration of the values of the following sensor elements of this line of the array into a sum, until a defined threshold of the value of a second sensor element is overshot, in particular wherein the integration is carried out using an analog charge store.

Here, a position index of the first sensor element and of the second sensor element can be detected in each case and the first position index and the second position index and the sum can be provided. In particular, the area sensor can have a computing unit which is embodied to establish a position index of a volume centroid of the code mark from the first position index and the second position index and the sum of a plurality of lines, in particular wherein sums of the lines are combined by calculation to form volumes for overlapping position indices in adjacent lines. Here, this combination to form volumes by calculation can be carried out by means of an analog integrator circuit. Here, the area sensor chip can also be embodied in such a way that it subtracts a trough threshold from each read value of the sensor element, in particular wherein the subtraction is carried out in an analog manner.

Figure 8:
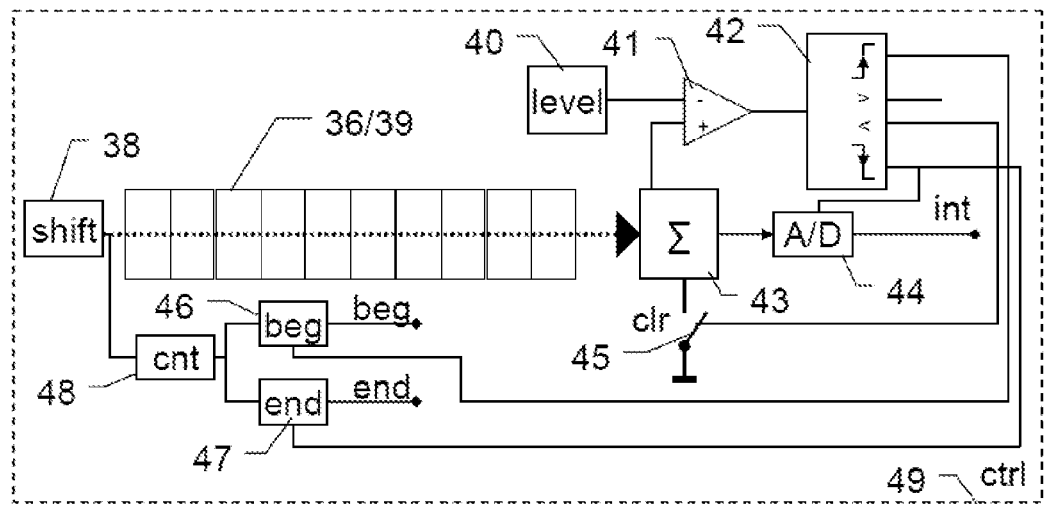
FIG. 8 shows a first exemplary embodiment of an area sensor according to the invention for determining centroids in a simplified block diagram.

FIG. 8 shows an example of an embodiment of an area sensor for determining centroids in accordance with the invention in a simplified block diagram for clarifying the functionalities according to the invention, which can be implemented in different practical embodiments. In contrast to the digital integral formation which can likewise be applied according to the invention, this embodiment uses an analog integration of the sensor values. A line 36 or 39 to be read, i.e., for example, an active sensor line, a readout line or a buffer storage line of a sensor chip (not depicted here) is shown, said sensor chip being embodied to evaluate code marks of a position code pattern 21 in a position encoder. The line 36/39 contains a sequence of scanned values of the position code geometrically established in succession, which values are also denoted pixel values or denoted by z(x,y). An x-direction is defined along this line. These pixel values can be read along the line, for example by means of a shift register or by means of an appropriately embodied switching matrix. Shown is e.g. a CCD readout line 39, the content of which can be shifted in the direction of the arrow on the basis of the clock signal 38. Here, the counter 48 counts the index of the pixel currently present at the output of the line. The current pixel value at the output are compared to a trough threshold 40 in each case, which is symbolized here by the comparator 41, the output of which is fed to the evaluation circuit 42. Alternatively, the trough threshold 40 can also be subtracted from the pixel value and the result can then be compared to greater than or less than zero (or positive or approximately zero—if no negative values are possible). Here, the trough threshold 40 can be embodied in a fixedly prescribed manner, in a parametrizable manner or in a dynamically adaptable manner. The primary object thereof is to suppress interference signals from the sensors and to carry out a distinction between code marks and gaps between the code marks. between If the pixel value is above the trough threshold, it is a code mark. A positive flank between a pixel value z below the trough threshold and a subsequent pixel value above the trough threshold therefore characterizes the beginning of a code mark. In this block diagram, the associated pixel index of the counter 48 is stored (latched) as code mark beginning index 46 in the case of such a beginning and it is provided for further evaluation.

A negative flank between a pixel value z above the trough threshold and a subsequent pixel value below the trough threshold therefore characterizes the end of a code mark. In this block diagram, the associated pixel index of the counter 48 is stored (latched) as code mark end index 47 in the case of such an end and it is provided for further evaluation.

(Usually a plurality of) pixels with values above the trough threshold 40 are situated between the beginning 46 and end 47, the number of said pixels specifying the width of the code mark in the direction x of the line. Here, information in respect of a sub-pixel resolution is provided with the pixel value.

All pixel values above the trough threshold—i.e. those of a code mark—are summed in the integrator 43—which is embodied in an analog manner here—, i.e. shifted into a common storage such as a potential well or a capacitor, in which the pixel values are integrated from the beginning 46 to end 47 of the code mark in the x-direction. At the end of the code mark, the integrated sum value 43 is provided—preferably in a manner digitized by the analog-to-digital converter in this embodiment. In particular, the code mark integral is provided together with the associated values of the beginning index and/or end index of this code mark, i.e. as a packet of information about these code marks which belongs together. In the gaps between the code marks, in which the pixel value lies below the threshold 43, there is no integration and the value of the integrator 43 can, as indicated by the reset symbol 45, be deleted.

Since a line generally detects a plurality of code marks of the area position code pattern, information packets about a plurality of code marks are provided for each line read and stored in each case, for example for further processing. The process described above is carried out for all lines of interest of the sensor area (also denoted y-direction here) in the case of an area sensor. However, in the special case of a single sensor line, this principle according to the invention can optionally also find corresponding use in order to establish centroids and/or width information about the code marks.

In contrast to a digitization of each individual pixel value mentioned further above, the clocking of the line can be carried out correspondingly faster in accordance with this aspect of the invention since the time-critical analog-to-digital conversion is only still carried out once per code mark and not once for each pixel of the sensor.

The above-described process is controlled in this case by a superordinate control logic 49, implemented by software and/or hardware, which is connected to the superordinate computing unit for determining centroids, on the basis of which centroids of the detected portion of the area position code pattern are evaluated and the absolute position is determined.

Figure 9:
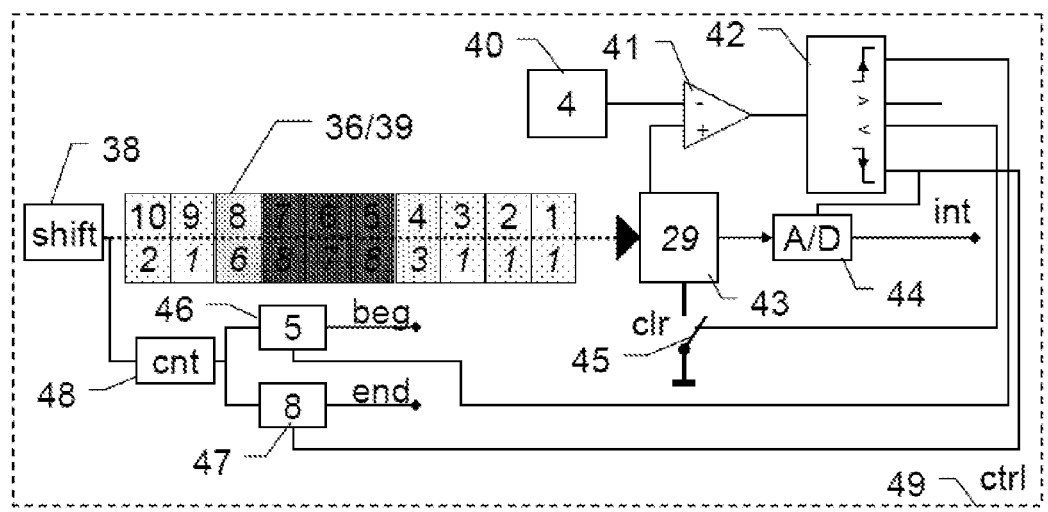
FIG. 9 shows a second exemplary embodiment of an area sensor according to the invention for determining centroids in a schematic block diagram with a numerical example.

FIG. 9 shows a specific numerical example of an embodiment similar to that of FIG. 8, in which the shown elements are already explained. The line 36/39 to be read now shows the pixel index in the upper half, which is also detected when clocking 38 with the block 48. Here, the index starts at 1, but it could also start at 0 or any other beginning value. In accordance with the detected pixel value, the cells of the line 36/39 are depicted with a brighter and darker pattern.

In the lower half, the associated sensor value is also depicted as a number in each case. Here, the threshold for identifying a code mark is selected to be 4, with all values used here being purely exemplary and non-restrictive.

The comparison 41 with the threshold 40 in this case results in a beginning index 46 of =5 and an end index 47 of =8 for the only code mark detected by the sensor in this case for the purposes of illustrative simplicity. Beginning index 46 and end index 47 of the code mark are stored in each case or provided for storage and/or further evaluation. The evaluation can then be carried out in a digital and/or at least partly analog computing unit, which determines a position index of the centroid of the detected code marks, for example as explained here in some exemplary variants.

With the beginning index 46 and end index 48, the integral value 43 of the code mark in the sensor direction is also established in the analog integrator 43 and provided—preferably in digitized form in this example by way of the converter 44. Here, the sum of the pixel values from the beginning index=5 to the end index=8 corresponds to a value of 8+7+8+6=29. Here, digitization can take place significantly more slowly than the clocking since the former can take place from the end of the code mark at the negative threshold comparison flank to the beginning flank of the subsequent code mark—or even up to the next end flank of the successive code mark if a sample-and-hold analog-to-digital converter 44 is used.

Figure 10:
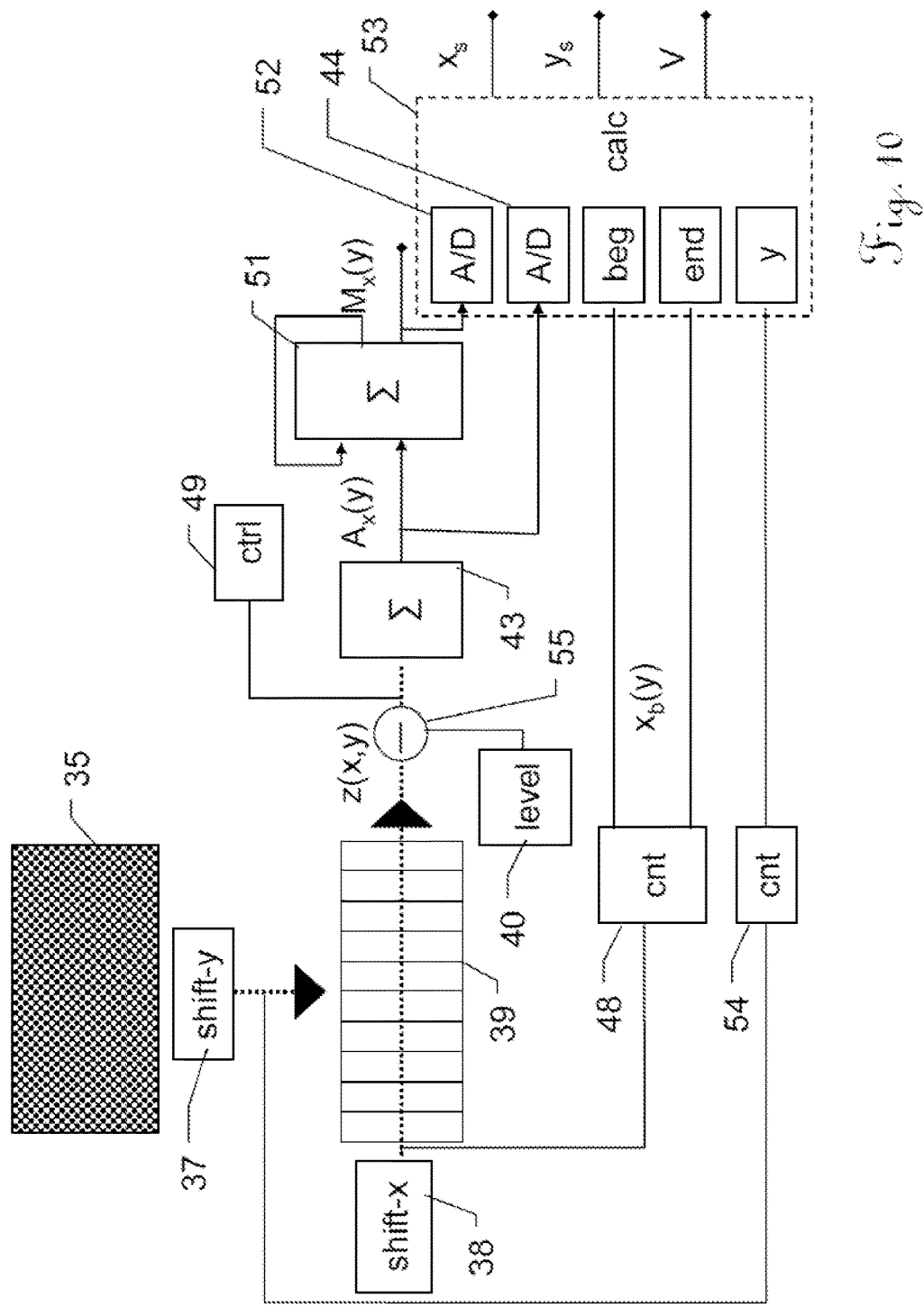
FIG. 10 shows a third exemplary embodiment of an area sensor according to the invention for determining centroids in a schematic block diagram.

FIG. 10 shows an example of an embodiment in which the area sensor 35 is evaluated in a manner that is similar to what was described above for FIG. 8 and FIG. 9, but in which there is a second analog integration by means of which centroid coordinates of position code markers are established, in particular, in at least two directions x and y. In this embodiment according to the invention, the two-dimensional area sensor 35 for establishing code mark centroids is always only read in the line direction x, but centroid coordinates are nevertheless established in at least two degrees of freedom. In the shown variant of one embodiment, the established values in the lines of the sensor 35 strung together in the y-direction are shifted by way of the line clock 37 into a readout structure 39 line-by-line. There, the individual pixel values of the respective line are clocked in the x-direction with the pixel clock 38. In the shown embodiment, a threshold value 40 is subtracted in each case from the clocked pixel value, which is depicted by the symbol 55. The embodiment in this example is embodied in such a way that the difference here can be zero at its smallest and no smaller than zero, even in the case of pixel values below the threshold. An increase of the difference value above zero is detected by the control unit 49 as a beginning of a code mark and a subsequent drop of the difference value to (at least approximately) zero is detected as an end of a code mark. The index $x_b(y)$, detected in block 48, is detected in each case for the beginning pixel and the end pixel of the code mark and provided for further processing. The established differences of the code mark pixels are accumulated to $A_x(y)$ for forming a sum in the integrator 43 and provided when the end of the respective code marks is detected and fed to further processing, i.e., for example, subjected to analog-to-digital conversion 44 and/or transferred in analog form for further processing. After the transfer, the integral value 43 can be deleted in order to be able to record the value of a subsequent code mark. As an alternative to the subtraction 55 of the trough threshold 40, there can also be, as already explained, a comparison with the threshold, on the basis of which the result of the current pixel value is accumulated or discarded.

Since the area sensor 28 usually detects a number of code marks 11 in one line, the results of the integrator 43 and/or of the index 48, 54 can be stored in analog or digital fashion for each one of the detected code marks 11, or a separate integrator 43 is provided for each one of the detected code marks 11, which integrators 43 are used in succession for the code marks 11. Such a procedure is possible in many cases as the maximum expected number of code marks in a line should be known by design. For storage purposes, use can be made, inter alia, of also e.g. a CCD-like shift register structure, similar to the readout line.

The procedure is carried out in the manner described above for all sensor lines y of interest of the area sensor 35 (in this example in succession, but alternatively also in parallel). In the variant shown here, there is a shift into the readout register 39 line-by-line with block 37 in this case. The associated y-index is detected and provided by block 54.

In the shown embodiment, the moment $M_x(y)$—in particular described above using the equations and the examples—is also established in addition to $A_x(y)$ by means of a second analog integration 51 and it is provided as an analog value for digitizing 52 and/or analog further processing.

On the basis of the provided values, a computing unit 53 determines the centroid coordinates $x_s$ and $y_s$ and optionally also the volume V, of the code marks of the area position code pattern and provides these for evaluating the position, in particular the absolute position, and/or rotational situation of the area sensor 35 in relation to the area position code pattern in one or more degrees of freedom. The principles for the calculation applied here were already explained above on the basis of the examples. Here, the computing unit 53 can have a completely digital, completely analog or else hybrid embodiment and, in particular, implement the equation formalism described above, or one equivalent thereto, for determining the centroid situations. A digital implementation can be carried out in software and/or hardware. Likewise, the computing unit 53, in particular in conjunction with block 49, can carry out the coordination of the described procedure. Here, it is also possible to implement more complex error detection or treatment routines, votings of the established centroid situations, averaging, compensation calculations, causality tests, etc. (which are not discussed in detail here) and the determination of the absolute position.

Developments and special embodiments can be embodied as described above, in particular also in combinations deviating from the shown examples.

FIG. 11 shows an example of a simplified block diagram of the invention, which is directed to generating an area position code according to the invention.

Here, block 71 represents a provision of a preferably regular basic pattern for code marks, for example like the one which was described in detail in an embodiment further above.

In block 72, there is a provision of two distinct codeword, and therefore distinguishable, absolute code sequences. Here, for example as explained above in one embodiment, a single common maximum sequence can be decomposed into two distinct element sequences.

In block 73 there then is encoding of the code marks of the basic grid by setting the code marks in relation to the basic grid positions thereof in accordance with the code values of the absolute code sequences. Here, the two absolute code sequences are arranged alternately in each case counter to their code sequence direction and each one of the code line pairs arising in the process is phase shifted differently in their code sequence positions, respectively in the code direction.

FIG. 12 shows an example of a simplified block diagram of the invention, which is directed to the evaluation according to the invention of an area position code according to the invention.

Block 74 represents a detection of a portion of the absolute area code using an area sensor and a determination of the situations of the code marks in the detected portion in relation to the area sensor, in particular with determining the situations of the centroids of the code marks as was already explained above in the various embodiments. Here, use can be made of a special area sensor for determining centroids with analog integration of pixel values in accordance with the above-explained special aspect of the invention.

In block 75, there is a determination of an alignment of the basic grid of the area position code on the basis of the previously established situations of the centroids, for example as was already explained above in detail.

In block 76, there is an evaluation of the encoding of the code marks in accordance with the previously determined alignment and a determination of absolute position information on the basis of an evaluation of the code marks in respect of the encoding thereof, in particular in at least three code lines in the alignment direction and on the basis of the two different absolute code sequences and a phase offset between the lines, as was explained in detail further above on the basis of examples. In a further step, there can then be exact positioning of the established absolute position information on the basis of the situations of the code marks determined in block 74.

Therefore, the absolute alignment and/or the absolute situation of the area sensor can be provided in relation to the area position code.

Figure 13A:
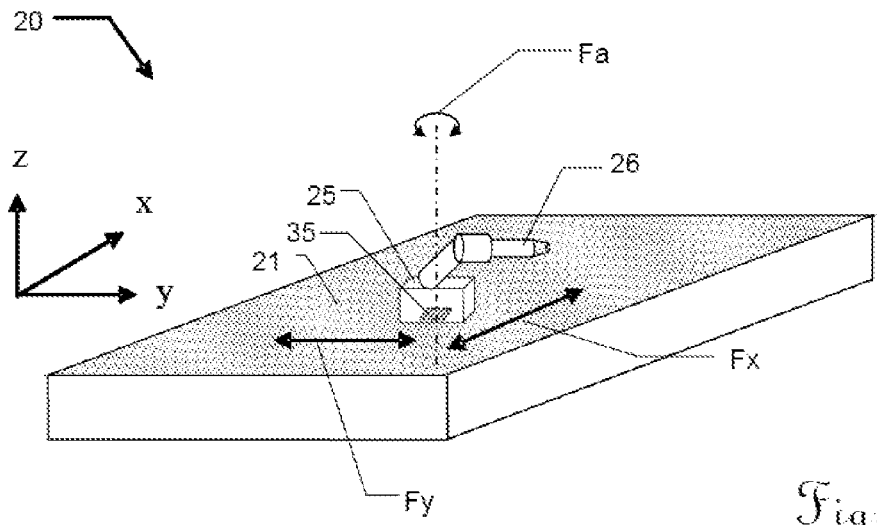

FIG. 13a shows an example of an embodiment in which a plane area is provided with an absolute code 21 according to the invention for determining the position. By way of example, this encoding according to the invention can, for example, consist of code marks which are printed thereon, adhesively bonded thereon as a film, engraved thereon by mechanical means or by way of a laser, etc. In the specific embodiment shown, this is a table of a coordinate measuring machine 20, onto which the absolute 2D code 21 according to the invention has been applied. One or more movable measuring and/or processing structures 25 can be situated on this table 20, which structures are embodied with an area sensor 35 for the position code determination according to the invention. It is possible to measure workpieces or other objects by moving these structures 28 on the absolute measurement system 20 embodied as a measuring table, for example in a sliding manner, driven by way of rollers or by being offset. By way of example, to this end, the structure 25 can be equipped with a measuring scanner 26 or another measuring device. Here, the position is determined in at least the two degrees of freedom $F_x$ and $F_y$, preferably as unique absolute position values on the whole encoded surface. Optionally, it is moreover possible to determine a rotational situation $F_r$ of the structure 25 in relation to the position code 21 in the plane of the encoded area, preferably likewise as an absolute rotational situation. Optionally, it is also possible to determine situation information in one or more of the remaining degrees of freedom, which, at best, can be carried out with a reduced accuracy in relation to $F_x$, $F_y$ and $F_r$, for example for distinguishing between operation as intended, maladjustments and/or for numerically compensating possible maladjustments on the basis of a mathematical model or mechanical adjustment.

Figure 13B:
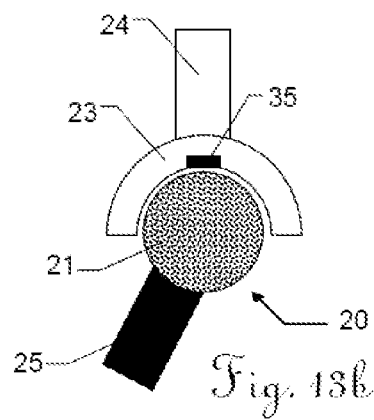
FIG. 13b shows an exemplary embodiment of the invention in an application in the case of a hinge.

FIG. 13b shows an example of an embodiment of an absolute measurement system 20, in which a sphere 21, encoded in absolute terms in accordance with the invention, is shown in a spherical angle encoder, a section of the surface of which is detected by an area sensor 35 which is shown in the socket 23. At least two or three degrees of freedom of the joint between the objects 24 and 25 are measured simultaneously on the basis of the code marks detected in the process. Instead of a sphere 21, the joint can, in another embodiment, e.g. also have a cylindrical embodiment, with or without the possibility of an offset along the cylindrical axis which, according to the invention, can likewise be detected.

Figure 13C:
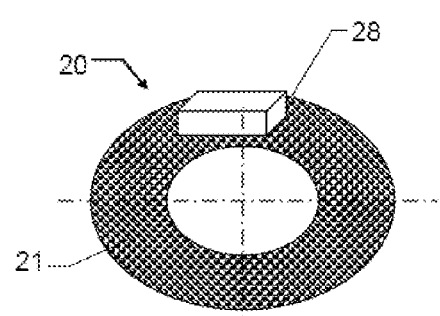
FIG. 13c shows an exemplary embodiment of the invention in an application in the case of a rotary encoder.
Figure 13D:
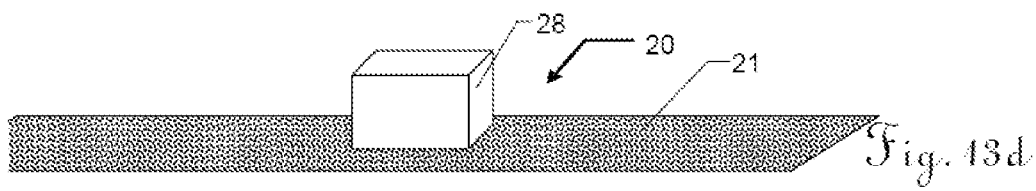
FIG. 13d shows an exemplary embodiment of the invention in an application in the case of a linear encoder.

A position code pattern 21 according to the invention—with or without one or more of the optional variants—, as was described previously in various embodiments, is likewise applicable in an embodiment according to the invention of an absolute measurement system 20, such as an angle encoder shown in FIG. 13c or a linear position encoder shown in FIG. 13d. Therefore, in addition to a two, three, four, five or six-dimensional position encoder, the invention also relates to such a linear or angle encoder with a position code pattern according to the invention. Although an angle or linear encoder in general is only provided with the primary object of carrying out a position determination in one degree of freedom, the position code according to the invention can, for example, however also improve such a determination of the position. Here, it is possible, for example with at least a single matrix sensor 35, to detect, quantify and/or numerically compensate mechanical or physical errors (like in e.g. EP 2 498 076 or the like) of the encoder or the measuring design. Here, the position code pattern according to the invention can determine information in more than one degree of freedom between the position code and matrix sensor, and the established position value in the primary degree of freedom can be improved with the additional information established in respect of the primary degree of freedom of interest, for example by virtue of possible position errors being established, statistically evaluated or numerically compensated by way of a deviation in one of the additional degrees of freedom.

In such embodiments, the area to be encoded can e.g. be closed, for example to form a band, ring, torus, cylinder, conical section or a different form. Here, at least one edge of the area position code pattern can close with another position of the position code, with, in this case, it not being necessary for the whole possible code value range to be exhausted everywhere. Here, in a special embodiment, the basic grid can optionally also be adapted in such a way that it is not Cartesian, but adapted to the area to be encoded; that is to say, for example, the lines and/or columns are not necessarily straight lined everywhere and/or equidistant everywhere.

In contrast to other solutions, such as e.g. EP 1 632 754, EP 1 944 582 or the like, it is only a single sensor element that is required, and a plurality of sensor elements are not mandatory, to establish errors such as eccentricity, wobble, temperature expansions, axial displacement etc. and, where necessary, on the basis of a corresponding mathematical model, to take these errors or the influences thereof into account or compensate these when establishing measured values of the only degree of freedom which is intended to be determined. Alternatively, or optionally, qualitative or quantitative error indicators can also be provided.

Here, an area sensor 35 for determining centroids according to the invention can be used in special embodiments of the examples of FIG. 13a, FIG. 13b, FIG. 13c and FIG. 13d.

Further embodiments, details and combinations of features of the present invention, as claimed in the patent claims and not explicitly listed here in the examples, are known to a person skilled in the art.

What is claimed is:

1. An area position code pattern for an area to be encoded in absolute terms, comprising;
    an arrangement of code marks in a basic grid, wherein at least a portion of said area position code pattern being readable by an optical matrix sensor for determining an absolute position information in at least one degree of freedom, wherein:

a first absolute code sequence encoded in a stringing-together of the code marks in a first line direction of the basic grid, which embodies a first line on the area to be encoded, and a second absolute code sequence encoded in a stringing-together of the code marks in the first line direction, which embodies a second line on the area to be encoded, which second line follows the first line, and wherein the first line and the second line form a line pair, and wherein the first absolute code sequence is codeword-distinct from the second absolute code sequence, wherein in a subsequent pair, which follows the line pair, the first and/or second absolute code sequences are arranged with a phase offset in the first direction of the basic grid, wherein the phase offset is an integer multiple of the grid positions.

2. The area position code pattern according to claim 1, wherein:

the code marks are detected by means of the area sensor in terms of the position thereof in relation to the area sensor on the basis of the volume centroids thereof and/or in terms of the size thereof on the basis of the volume thereof.

3. The area position code pattern according to claim 1, wherein:

the area position code pattern is built up by standardized, uniform code marks.

4. The area position code pattern according to claim 3, wherein the code marks comprising convex external contours.

5. The area position code pattern according to claim 1, wherein:

a value encoding of one of the code marks is embodied in the form of a geometric deviation of the code mark from an intended position in the basic grid, wherein the basic grid is orthogonal or hexagonal and, wherein the deviation is less than ⅓, preferably approximately 1/10 of a period of the basic grid.

6. The area position code pattern according to claim 1, wherein:

the first absolute code sequence and the second absolute code sequence have the same code direction in the basic grid.

7. The area sensor for determining centroids according to claim 1, wherein:

the area sensor is embodied in such a way that, with an array of sensor elements, there is a line-by-line read out, during which read out for a line of the array there is, from overshooting a defined trough threshold by the read value at a first sensor element to undershooting the trough threshold at a second sensor element, integration of the read values of the sensor elements of this line of the array into a summed value, wherein a first position index of the first sensor element and a second position index of the second sensor element are each detected along the sensor line and the summed value and the first position index and second position index are provided by the area sensor.

8. The area sensor for determining centroids according to claim 7, wherein:

the area sensor comprises an analog accumulator, which is embodied in such a way that, therewith, the integration of the read values of the sensor elements is carried out in analog form.

9. The area sensor for determining centroids according to claim 7, wherein:

it comprises at least one analog comparator, which is embodied in such a way that, a read value of the sensor elements going over and/or below the defined trough threshold is determined.

10. The area sensor for determining centroids according to claim 7, wherein:

it has at least one analog subtraction circuit, which is embodied in such a way that, therewith, the trough threshold is respectively subtracted from the read values of the sensor elements prior to the integration and positive difference values resulting therefrom are integrated, wherein the overshooting and/or undershooting of the defined trough threshold is also established on the basis of the difference values.

11. The area sensor for determining centroids according to claim 7, wherein:

the area sensor has a computing unit, which is embodied to establish a centroid position index from the first position index and the second position index and the sum.

12. The area sensor for determining centroids according to claim 7, wherein:

it has at least one integrator circuit, which is embodied in such a way that the sums for overlapping position indices are integrable over a plurality of lines.

13. The area sensor for determining centroids according to claim 12, wherein the integrator circuit is an analog integrator circuit.

14. The area sensor for determining centroids according to claim 7, wherein:

the area sensor has a computing unit, which is embodied to establish a centroid position index with a fractional component, from the first position index and the second position index and the sum.

15. A method for encoding absolute positions of surfaces with an absolute code pattern, which comprises provision of a regular basic grid for code marks, provision of two codeword-distinct absolute code sequences, and encoding of the code marks of the basic grid with an offset of the code marks in relation to the basic grid positions thereof in accordance with the code values of the absolute code sequences, wherein both of the absolute code sequences are respectively arranged in an alternate manner counter to the code sequence direction thereof and/or each code line pair arising in the process respectively has a different phase shift in the grid in terms of the code sequence position thereof in the code sequence direction.

16. The method for encoding absolute positions of surfaces with an absolute code pattern according to claim 15, wherein the two codeword-distinct absolute code sequences is from a single, common maximum sequence which is decomposed into two distinct element sequences.

17. A method for evaluating an area absolute code pattern, comprising:

detecting a section of the area absolute code pattern by an area sensor and determining a situation of code marks of the area absolute code pattern in the detected section in relation to the area sensor, determining an alignment of a basic grid of the area absolute code pattern on the basis of the previously established situations of the code marks, evaluating an encoding of the code marks in accordance with the previously determined alignment, determining absolute position information on the basis of evaluating the encoding of the code marks, wherein the evaluation is carried out in a plurality of lines aligned in the alignment of the basic grid, which lines have at least two distinct codeword absolute code sequences and, on the basic grid, a phase offset between the lines, locating the established absolute position information on the basis of determined situations of the code marks which underlie the absolute position information, and providing the alignment and/or the absolute situation of the area sensor in relation to the area absolute code pattern.

18. A computer program product comprising program code, which is stored on a data medium, which is embodied to execute a method according to claim 17 on a digital computer.

19. The method for evaluating an area absolute code pattern according to claim 17, wherein detecting a section of the area absolute code pattern comprises determining the situations of the centroids of the code marks.

20. The method for evaluating an area absolute code pattern according to claim 17, wherein detecting a section of the area absolute code pattern comprises determining the situations of the centroids of the code marks using an area sensor for determining centroids.

\* \* \* \* \*